(12) United States Patent
Nishimura

(10) Patent No.: US 11,806,906 B2
(45) Date of Patent: Nov. 7, 2023

(54) PARTING LOCK DEVICE AND INJECTION MOLDING MOLD ASSEMBLY USING SAME

(71) Applicant: AIYUKI GIKEN CO., LTD., Osaka (JP)

(72) Inventor: Masatoshi Nishimura, Osaka (JP)

(73) Assignee: AIYUKI GIKEN CO., LTD., Osaka (JP)

( * ) Notice: Subject to any disclaimer, the term of this patent is extended or adjusted under 35 U.S.C. 154(b) by 62 days.

(21) Appl. No.: 17/615,937

(22) PCT Filed: Nov. 18, 2019

(86) PCT No.: PCT/JP2019/045050
§ 371 (c)(1),
(2) Date: Dec. 2, 2021

(87) PCT Pub. No.: WO2020/250456
PCT Pub. Date: Dec. 17, 2020

(65) Prior Publication Data
US 2022/0314510 A1 Oct. 6, 2022

(30) Foreign Application Priority Data

Jun. 14, 2019 (WO) .................. PCT/JP2019/023670

(51) Int. Cl.
*B29C 45/66* (2006.01)
*B29C 33/20* (2006.01)
*B29C 45/26* (2006.01)

(52) U.S. Cl.
CPC .............. *B29C 45/66* (2013.01); *B29C 33/20* (2013.01); *B29C 45/2602* (2013.01)

(58) Field of Classification Search
CPC .......... B29C 45/641; B29C 2045/2604; B29C 2045/642; B29C 2045/667
See application file for complete search history.

(56) References Cited

U.S. PATENT DOCUMENTS 4,403,810 A * 9/1983 Bieneck .................... H03F 3/24
425/DIG. 221
2018/0326637 A1* 11/2018 Nishimura ............ B29C 45/641

FOREIGN PATENT DOCUMENTS

| CN | 204451115 | 7/2015 |
|----|-----------|--------|
| JP | 10-623 | 1/1998 |

(Continued)

OTHER PUBLICATIONS

International Search Report dated Dec. 17, 2019 in International (PCT) Application No. PCT/JP2019/045050.

(Continued)

*Primary Examiner* — Kelly M Gambetta
*Assistant Examiner* — Virak Nguon
(74) *Attorney, Agent, or Firm* — Wenderoth, Lind & Ponack, L.L.P.

(57) ABSTRACT

In a parting locking device for an injection molding mold assembly, a first engagement element and a first spring are mounted in the base holder. With a locking plate inserted in a plate insertion hole, the first engagement element moves to a locking position where the base holder and a locking member are coupled together. When a locking bar is pulled out of a bar insertion hole, the first engagement element is pushed and moved to an unlocking position where the base holder and the locking member are uncoupled from each other.

12 Claims, 18 Drawing Sheets

(56) References Cited

FOREIGN PATENT DOCUMENTS

| | | | |
|---|---|---|---|
| JP | 10-323744 | 12/1998 | |
| JP | 11-114999 | 4/1999 | |
| JP | 2000-202882 | 7/2000 | |
| JP | 2004-74591 | 3/2004 | |
| JP | 2005-161669 | 6/2005 | |
| JP | 3761690 | 3/2006 | |
| JP | 2010-184352 | 8/2010 | |
| WO | 2017/037893 | 3/2017 | |
| WO | WO-2017037893 A1 * | 3/2017 | ............ B29C 33/20 |

OTHER PUBLICATIONS

Written Opinion of the International Searching Authority dated Dec. 17, 2019 in International (PCT) Application No. PCT/JP2019/045050 With English translation.

* cited by examiner

PARTING LOCK DEVICE AND INJECTION MOLDING MOLD ASSEMBLY USING SAME

TECHNICAL FIELD

The present invention relates to a parting locking device to be mounted to the molds of an injection molding machine for resin or metal molding, and an injection molding mold assembly using the parting locking device.

BACKGROUND ART

Parting locking devices are mainly used in three-plate type injection molding machines to separate the movable mold of each injection molding machine from a stripper plate in a predetermined order.

Three-plate type of injection molding machines include, besides the fixed mold and movable mold that define a cavity for molding, a stripper plate which is brought into contact with and separated from the movable mold. A parting locking device is used in such a three-plate type of injection molding machine so as to separate, when opening the cavity, the stripper plate from the movable mold before separating the movable mold from the fixed mold.

With the distal end of a spool bush of this injection molding machine inserted into the stripper plate, molten resin or metal material is supplied through the inserted spool bush, guided to a gate disposed in the movable mold, and injected into the cavity.

Thereafter, the stripper plate is first separated from the movable mold so that a runner portion formed between the stripper plate and the movable mold is separated from the product (material injected into the cavity).

Next, the movable mold is separated from the fixed mold, and the now-hardened product (end product of resin or metal) in the cavity is taken out of the fixed mold.

By moving the stripper plate before separating the movable mold from the fixed mold, it is possible to prevent deformation of the product.

The above method requires that the movable mold be kept coupled to the fixed mold (separation of the parting surfaces be prevented) until the stripper plate is moved to a predetermined position where the runner portion is separated from the product. Parting locking devices are used for this purpose.

Parting locking devices of one type include a base holder and a locking member corresponding, respectively, to the fixed mold and the movable mold of a three-plate type of injection molding machine; and a locking bar mounted to the stripper plate of the molding machine, in which the base holder and the locking member are coupled together or uncoupled from each other by changing the insertion state of the locking bar relative to the locking member.

FIG. 23 illustrates one of parting locking devices of this type. The parting locking device of FIG. 23 is disclosed as prior art in PCT International application Publication No. WO2017/037893 (hereinafter, WO '893), and includes a locking bar 51 mounted to a stripper plate 35.

When the locking bar 51 is inserted between a base holder 55 and an engagement claw 53 pivotable about a support pin 52, the engagement claw 53 is kept in engagement with a locking claw 54.

When the locking bar 51 is pulled out of the base holder 55, the engagement claw 53 disengages from the locking claw 54 by being pushed by a spring-loaded pushpin 56, and a locking member 57 is uncoupled from the base holder 55, so that a movable mold 34 becomes separable from a fixed mold 32.

The parting locking device of WO '893 was developed by the inventor of the present application for the purpose of overcoming defects in the device of FIG. 23 and the device (automatic mold opening/closing device) of Japanese Patent No. 3761690 (hereinafter, JP '690).

The below-described defects (1) to (3) are seen in the parting locking device of FIG. 23, and the below-described defect (4) is seen in the parting locking device for molds of JP '690.

Defect (1): When the stripper plate 35 moves up, the locking claw 54 is pushed against the engagement claw 53, so that the engagement claw 53 may become unable to move to the unlocking point.

Defect (2): The stroke of the locking bar (i.e., the stroke of the stripper plate 35) is large when disengaging the engagement claw 53 and the locking claw 54 from each other, and this results in the motion loss of the injection molding machine.

Defect (3): When the engagement claw 53 is pushed by the locking bar 51 and moved to the engagement point at which the engagement claw 53 engages with the locking claw 54, the support pin 52 receives a bending force, and this could hamper smooth movement of the engagement claw 53, thus hampering stable engagement and disengagement of the engagement claw 53 relative to the locking claw 54.

Defect (4): In the automatic mold opening and closing device of JP '690, while the above defect (2) is not seen, a defect similar to the above defect (1) is seen. Specifically, when the stripper plate moves up, an engagement element engaged in an engagement recess, keeping the movable and fixed molds coupled together, gets wedged between the locking bar and the engagement recess. This makes the movement of the locking bar difficult, thus hindering the separation of the movable mold from the fixed mold.

In the parting locking device of WO '893, when an engagement element mounted in the locking member engages in engagement recesses disposed in the base holder, the base holder and the locking member are kept coupled together.

By, when the stripper plate moves up, forcibly moving and pushing this engagement element to the unlocking point by use of the locking bar, the above defects (1) and (4) are overcome.

Also, by pushing and moving the engagement element to the unlocking point by use of the locking bar before the locking bar is completely pulled out of a plate insertion hole disposed in the base holder, the above defect (2) is overcome.

Also, by, when the stripper plate moves up, making the engagement element remain in the recesses of the base holder so that a bending force is not applied to guide shafts supporting the engagement element, the above defect (3) is overcome.

In the parting locking device of WO '893, it is possible to uncouple the base holder and the locking member from each other even with the locking bar inserted in the locking member, and thereby to stabilize the movement of the locking bar. However, there is still room for improvement in terms of simplifying the structure, easily manufacturing and assembling the device, and reducing the size of the device.

It is an object of the present invention to realize and provide a parting locking device for an injection molding mold assembly which, compared to the parting locking device of WO '893, has a simple structure; can be easily manufactured and assembled; and is reduced in size, while taking advantage of the features of the parting locking device of WO '893, which is free of the above defects (1) to (4).

SUMMARY OF THE INVENTION

In order to achieve the above object, the present invention provides a parting locking device comprising: a base holder having a first bar insertion hole extending vertically through the base holder, and a plate insertion hole extending parallel to the first bar insertion hole; a locking member having a second bar insertion hole, and including a locking plate configured to be inserted into the plate insertion hole; a locking bar capable of being inserted into, and pulled out of, the first and second bar insertion holes of the base holder and the locking member; a first engagement element and a first spring both mounted in the base holder; and a second engagement element carried by the locking plate, wherein the base holder further has a guide hole configured to guide movement of the first engagement element in a direction orthogonal to a center axis of the first bar insertion hole, wherein the first bar insertion hole and the plate insertion hole communicates with each other via the guide hole, wherein the first engagement element includes: an engagement claw configured to retractably protrude into the plate insertion hole from the guide hole; and a first input portion configured to retractably protrude into the first bar insertion hole from the guide hole, wherein the locking plate includes a recess configured to receive a portion of the engagement claw protruding into the plate insertion hole, wherein the locking bar includes: a first cam surface disposed on one side of the locking bar, and configured to push the first input portion, when the first input portion protrudes into the first bar insertion hole, into the guide hole; and an interference avoiding recess located above the first cam surface, and configured to receive the first input portion when the first input portion protrudes into the first bar insertion hole, wherein the first engagement element is configured to be selectively moved to a locking position and an unlocking position by being pushed in opposite directions by the first spring and the locking bar, respectively, wherein the engagement claw is configured to protrude into the plate insertion hole with the first engagement element located at the locking position, and the engagement claw is configured to retract into the guide hole with the first engagement element located at the unlocking position, wherein, when the first engagement element is located at the locking position, the engagement claw is configured to engage with the second engagement element so as to prevent the locking plate from being pulled out of the plate insertion hole, and wherein, when the first engagement element is located at the unlocking position, the engagement claw is configured to be disengaged from the second engagement element so as to allow the locking plate to be pulled out of the plate insertion hole.

The first engagement element moves to the locking position by being pushed by the spring or the locking bar.

In the parting locking device in which the first engagement element moves to the locking position by being pushed by the spring, the biased direction of the first engagement element in which the first engagement element is biased by the spring may be set to be the direction in which the first engagement element moves from the plate insertion hole of the base holder toward the first bar insertion hole thereof, or set to be the direction opposite to this direction, i.e., the direction in which the first engagement element moves from the first bar insertion hole toward the plate insertion hole.

The first engagement element which has now moved to the locking position returns to the unlocking position by pushing, with the locking bar or a spring provided separately from the first spring, the first input portion in the direction opposite to the biased direction of the first engagement element in which the first engagement element is biased by the first spring, As a particularly preferable arrangement, the following arrangement may be used: The engagement claw of the first engagement element and the part of the first engagement element including the first input portion are separated from each other between the plate insertion hole and the first bar insertion hole of the base holder; the engagement claw is biased in the locking direction by the first spring; and the part including the first input portion is biased in the unlocking direction by a spring (third return spring in an embodiment described later) provided separately from the first spring.

In the parting locking device in which the first engagement element moves from the unlocking position to the locking position by being pushed by the locking bar, the biased direction of the first engagement element in which the first engagement element is biased by the first spring is set to be the direction in which the first engagement element moves toward the unlocking position. The first engagement element further includes a second input portion which protrudes into the first bar insertion hole when the first engagement element is located at the unlocking position.

The locking bar further includes (i) a second cam surface by which, when the locking bar inserted in the first bar insertion hole moves in the locking direction (downward direction), the second input portion is pushed and retreated into the guide hole (and, as a result, the first engagement element moves to the locking position); and (ii) a locking position keeping portion which keeps the first engagement element at the locking position by preventing the return of the second input portion which has now retreated.

The second engagement element may be integral with the locking plate, or may be mounted in the locking plate so as to be slidable while being biased by a spring and so as to be able to retreat from the engagement portion of the engagement claw with which the second engagement element is engaged, The sliding direction of the second engagement element, mounted in the locking plate so as to be slidable while being biased by a spring, is orthogonal to the center axis of the plate insertion hole. A second spring is disposed in the locking member so as to bias the second engagement element, thereby allowing the second engagement element to protrude into the recess of the locking plate from the interior of the locking plate.

At least one of the upper surface of the engagement claw and the lower surface of the second engagement element which comes into contact with the upper surface of the engagement claw is an inclined surface which generates, at the contact portions of the lower and upper surfaces, a component force in the direction in which the second engagement element retreats into the locking plate.

If such parting locking devices are installed to a three-plate type of injection molding machine, the base holders are fixed to the fixed mold of the injection molding machine; the locking members are fixed to the movable mold of the injection molding machine; and the locking bars are fixed to a stripper plate of the injection molding machine.

The prevent invention also provides an injection molding mold assembly used in an injection molding machine, and having two sides to which such parting locking devices are installed. The injection molding mold assembly is described in detail later.

In the parting locking device of the present invention, not only when the locking bar is pulled out of the locking member, but also when the locking bar has not yet been completely pulled out of the bar insertion hole of the base holder, the locking member is uncoupled from the base holder. Therefore, it is not necessary to increase the stroke of the locking bar to a large degree, and it is possible to reduce the motion loss of the mold.

Also, since, when the first cam surface of the locking bar pushes and moves the first input portion of the first engagement element, the engagement claw is pulled back into the guide hole, and forcibly disengaged from the second engagement element, the force separating the locking member from the base holder is applied to the locking member. Therefore, even if the engagement claw is pushed against the second engagement element, the engagement claw is reliably separated from the engagement element, and the base holder and the locking member are stably uncoupled from each other.

Also, since, with the engagement claw retreated in the guide hole, nothing applies resistance to the locking plate when pulling the locking plate out of the plate insertion hole, it is possible to smoothly pull the locking plate out of the plate insertion hole, and thus smoothly separate the locking member from the base holder.

Therefore, in the injection molding mold assembly using this parting locking device, when opening the cavity, the movable mold can be separated from the fixed mold with no problem.

Also, the base holder can be constituted by a body of which one surface has portions located at a deeper position (lower level); a lid plate mounted to the one surface of the body; and a first engagement element and a first spring both mounted in the body.

The locking member can be constituted by a body having a lower portion from which a locking plate hangs; a recess for receiving the engagement claw disposed in the locking plate; and a second engagement element with which the engagement claw engages (if a slidable second engagement element is used, a second spring is added). Therefore, compared to the device of WO '893, this parting locking device has a simple structure; can be easily manufactured and assembled; and is reduced in size.

In the parting locking device in which the second engagement element is slidably mounted in the locking plate, even when the first engagement element is pushed and moved to the locking position by the locking bar before the insertion of the locking plate into the plate insertion hole, it is possible to couple the base holder and the locking member together by inserting the locking plate into the plate insertion hole, and to keep them coupled together.

In a three-plate type of injection molding machine, if the first engagement element is pushed and moved to the locking position by the locking bar before the insertion of the locking plate into the plate insertion hole, the engagement claw of the first engagement element has already protruded into the plate insertion hole when inserting the locking plate into the plate insertion hole.

In this state, if the second engagement element is fixed in position, the engagement claw now protruding into the plate insertion hole becomes an obstacle preventing the insertion of the locking plate into the plate insertion hole, whereas, if the second engagement element is slidably mounted in the locking plate, the engagement claw never becomes such an obstacle.

DETAILED DESCRIPTION OF THE INVENTION

Figure 1:
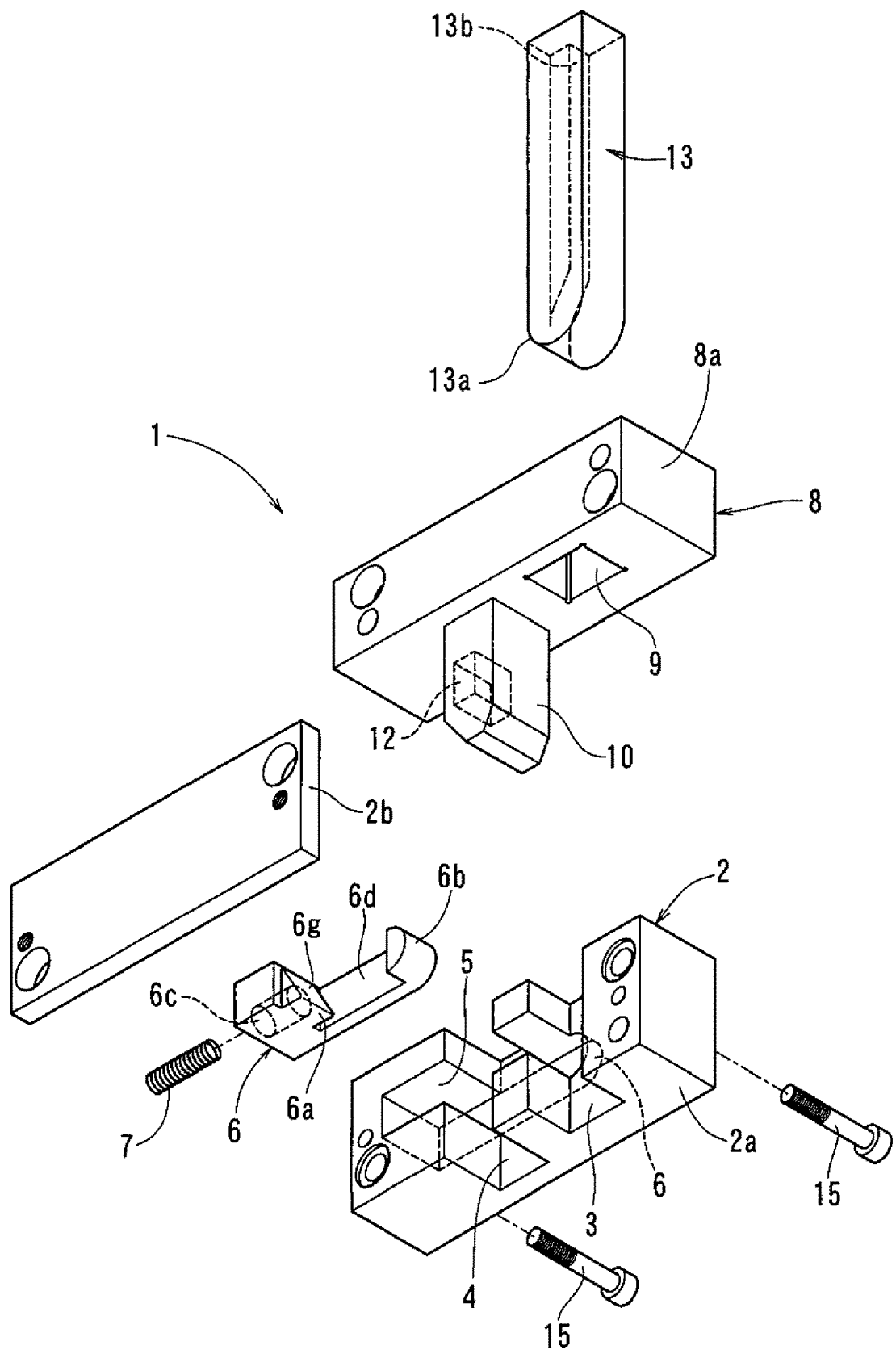
FIG. 1 is an exploded perspective view of a parting locking device according to a first embodiment of the present invention.
Figure 2:
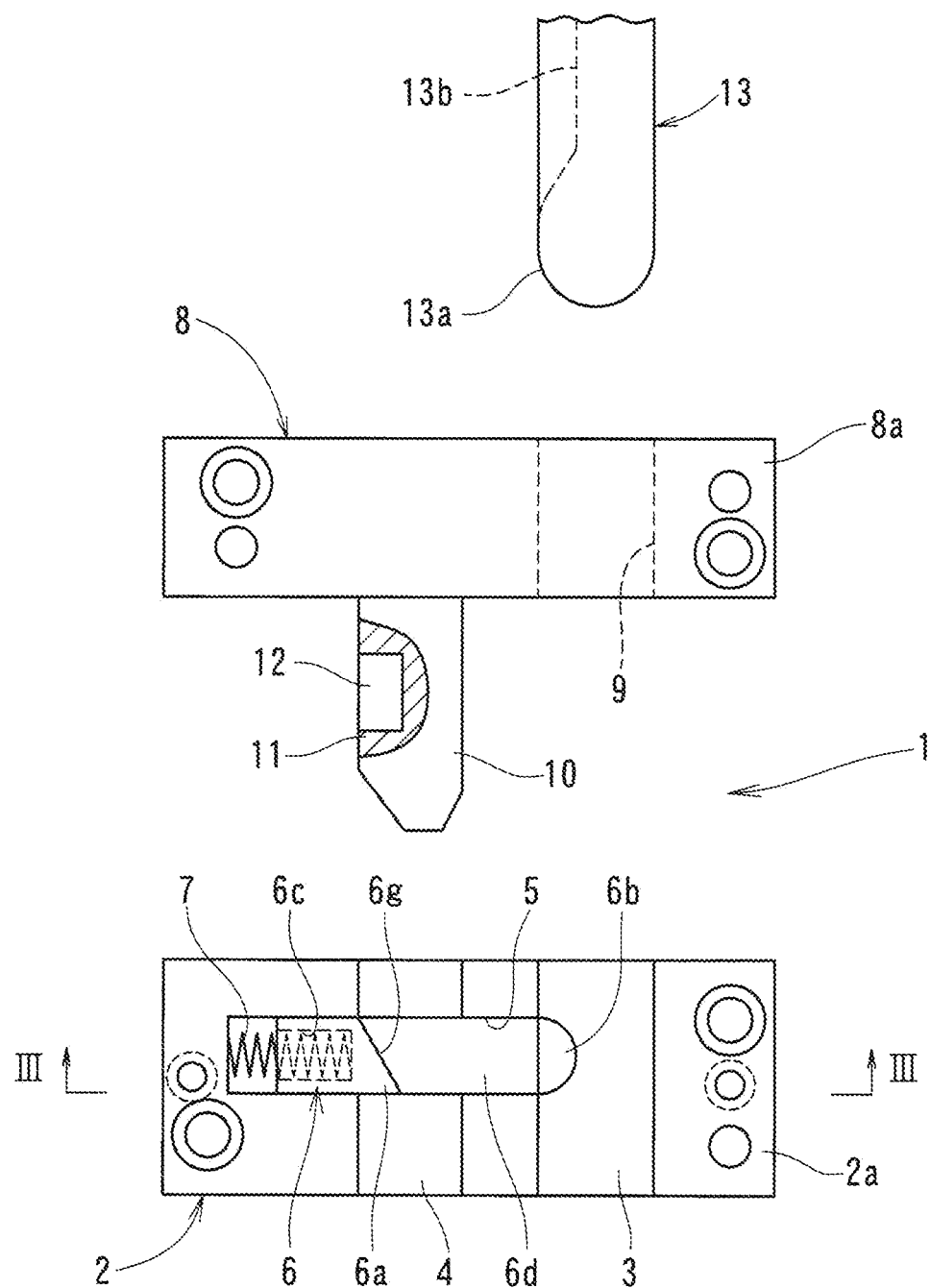
FIG. 2 is a side view of the parting locking device of FIG. 1 with a lid plate removed from a base holder, and with a portion of a locking plate of a locking member broken.
Figure 3:
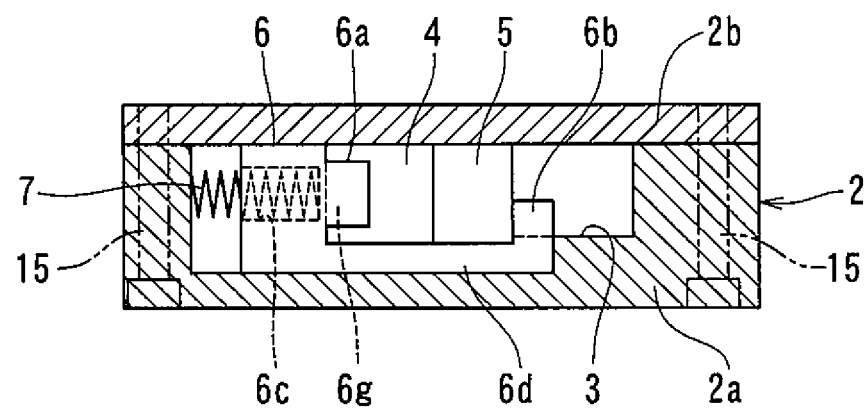
FIG. 3 is a sectional view of the base holder of the parting locking device of FIG. 1 taken along line III-III of FIG. 2.
Figure 4:
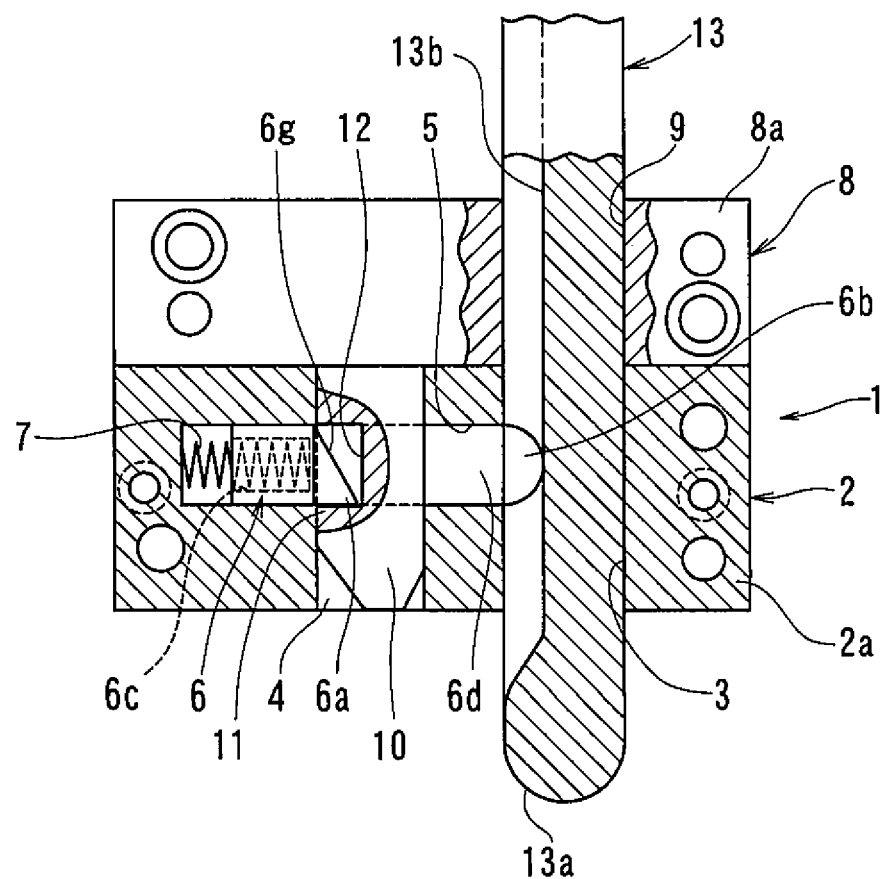
FIG. 4 is a partially broken side view of the parting locking device of FIG. 1 with the base holder and the locking member coupled together.
Figure 5:
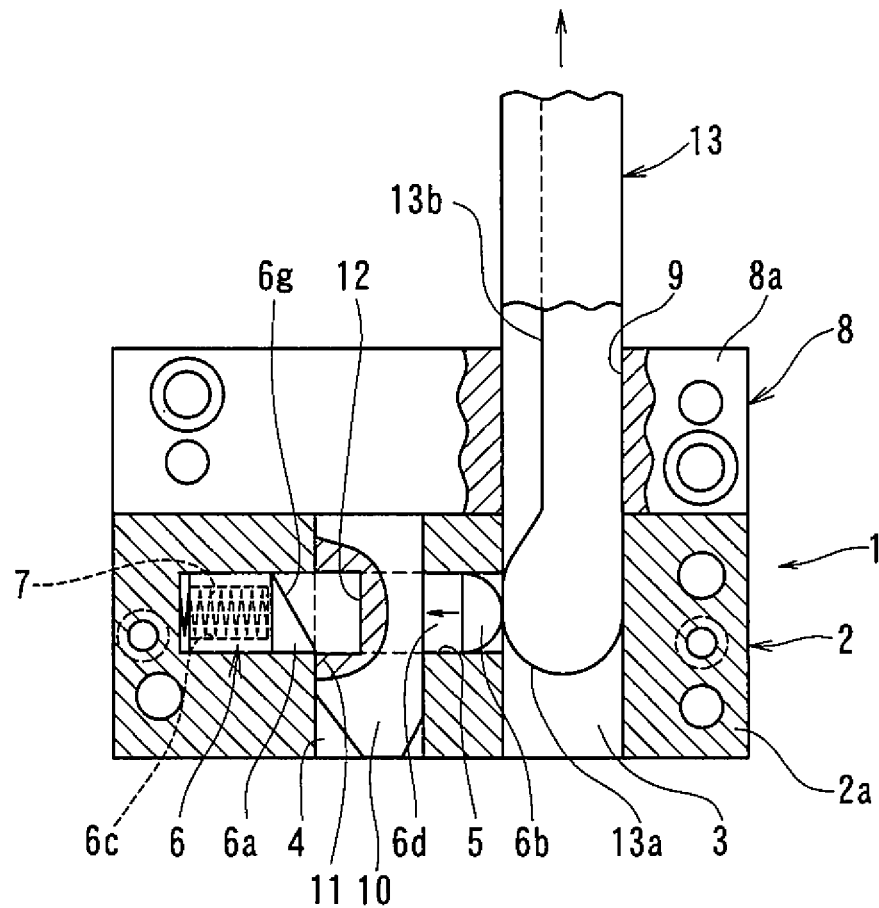
FIG. 5 is a partially broken side view of the parting locking device of FIG. 1 in which a first engagement element has been pushed and moved to an unlocking position by a locking bar.

Embodiments of a parting locking device and an injection molding mold assembly using parting locking devices are described below with reference to FIGS. 1 to 22 of the attached drawings.

The parting locking device 1 of FIGS. 1 to 5 (according to the first embodiment of the present invention) has a basic structure, and includes a base holder 2; a locking member 8 including a locking plate 10; a locking bar 13 capable of being inserted into, and pulled out of, the locking member 8 and the base holder 2; a first engagement element 6 mounted in the base holder 2; a first spring 7 biasing the first engagement element 6 in one direction; and a second engagement element 11 (see FIGS. 2, 4 and 5) disposed in the locking member 8.

The base holder 2 is a combination of a body 2a and a lid plate 2b that are fastened together by bolts 15 (see FIGS. 1 and 3), and has a bar insertion hole 3 (first bar insertion hole) extending vertically through the base holder 2; a plate insertion hole 4 similarly extending vertically through the base holder 2; and a guide hole 5 extending in the direction orthogonal to the center axis of the bar insertion hole 3.

The bar insertion hole 3 and the plate insertion hole 4 are both quadrangular holes, and are defined by forming grooves in one surface of the body 2a, and closing, with the lid plate 2b, the openings of the grooves on the one surface.

The bar insertion hole 3 and the plate insertion hole 4 communicate with each other via the guide hole 5. The end of the guide hole 5 supporting one end of the first spring 7 protrudes into the body 2a in the direction opposite to the direction in which the first engagement element 6 is biased by the first spring 7.

The guide hole 5 has a portion located at a deeper position (lower level) than the bottoms of the grooves forming the bar insertion hole 3 and the plate insertion hole 4, and the below-described bridge portion 6d of the first engagement element 6 is received in this portion of the guide hole 5.

The bar insertion hole 3 and the plate insertion hole 4 extend parallel to each other, and are different in size from each other, so that insertion of the locking plate 10 into the bar insertion hole 3 is not allowed. This prevents wrong coupling of the base holder 2 and the locking member 8.

The first engagement element 6 and the first spring 7 are mounted in the guide hole 5 of the base holder 2.

The first engagement element 6 includes an engagement claw 6a; a first input portion 6b; and a spring receiving hole 6c in which the other end portion of the first spring 7 is inserted. The engagement claw 6a and the first input portion 6b are connected together via the bridge portion 6d such that the first input portion 6b is opposed to a front surface of the engagement claw 6a.

The bridge portion 6d has a thickness (dimension in the direction in which the guide hole 5 is recessed) equal to the distance from the plate insertion hole 4 to the bottom of the guide hole 5. Therefore, the bridge portion 6d does not protrude into the plate insertion hole 4.

The engagement claw 6a protrudes into the plate insertion hole 4 when the first engagement element 6 is located at its movement end point on the side of the bar insertion hole 3. The first input portion 6b protrudes into the bar insertion hole 3 when the first engagement element 6 is located at its movement end point on the side of the bar insertion hole 3.

The engagement claw 6a has a lower surface extending in the direction orthogonal to the center axis of the plate insertion hole 4, and configured to engage with the second engagement element 11. Also, the engagement claw 6a has, on its portion which protrudes into the plate insertion hole 4, an upper surface 6g (see FIG. 2) inclined such that the amount by which the engagement claw 6a protrudes into the plate insertion hole 4 gradually increases toward the lower side of the engagement claw 6g.

By pushing the locking plate 10 against the inclined upper surface 6g, a component force in the direction orthogonal to the center axis of the plate insertion hole 4 is generated at its portion in contact with the locking plate 10, and the component force pushes and moves the first engagement element 6 in the direction in which the engagement claw 6a retreats from the guide hole 5.

The corner of the lower portion of the locking plate 10 on the side of the engagement claw 6a is also an inclined surface corresponding to the inclined upper surface 6g of the engagement claw 6a. The provision of such an inclined surface reduces the surface pressure of the contact portion, and thus is preferable.

When the first engagement element 6 of the parting locking device 1 of FIGS. 1 to 5 is at the movement end point on the side of the bar insertion hole 3 (i.e., position where the amount by which the engagement claw 6a protrudes into the plate insertion hole 4 is maximum), the first engagement element 6 is at a locking position where the base holder 2 and the locking member 8 are coupled together. When the engagement claw 6a is retracted into the guide hole 5, the first engagement element 6 is at an unlocking position (where the base holder 2 and the locking member 8 are uncoupled from each other).

In the initial state before the base holder 2 and the lock member 8 are coupled together, the first engagement element 6 is kept at the locking position by the force of the first spring 7.

The locking member 8 includes a bar insertion hole 9 (second bar insertion hole), the locking plate 10, the second engagement element 11, and a recess 12 which the engagement claw 6a enters. The bar insertion hole 9 extends vertically through the body 8a of the locking member 8, at a position corresponding to the position of the bar insertion hole 3 of the base holder 2.

The locking plate 10 is integral with the body 8a of the locking member 8, and hangs from the lower portion of the body 8. The recess 12 is formed on one side of the locking plate 10. The flat surface of the recess 12 orthogonal to the center axis of the plate insertion hole 4 and facing upward constitutes the second engagement element 11 (engagement surface), which engages with the engagement claw 6a.

Figure 6:
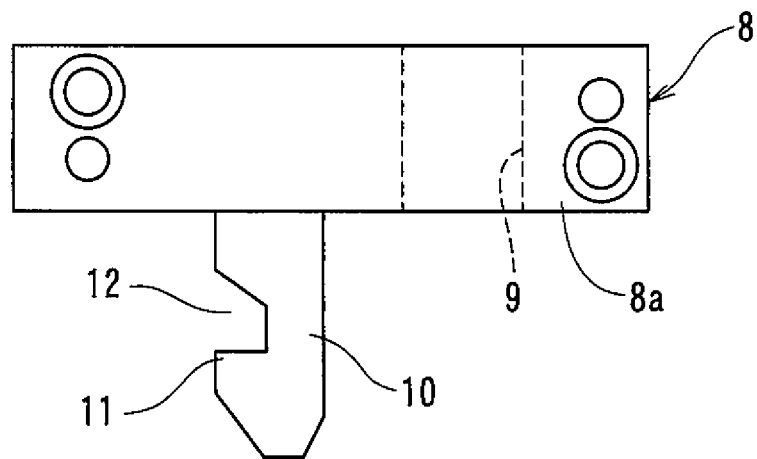
FIG. 6 is a side view illustrating a variation of the locking member of the parting locking device of the first embodiment.

The recess 12 is configured to receive the engagement claw 6, and may be formed not only by digging the locking plate 10 but also by cutting out the one side of the locking plate 10 as illustrated in FIG. 6.

The locking bar 13 has, on the one side thereof, a first cam surface 13a and a recess 13b for avoiding interference. The first cam surface 13a is located at the lower portion of the locking bar 13.

The recess 13b for avoiding interference is located above the first cam surface 13a. When the locking bar 13 moves up until it separates from the first input portion 6b of the first engagement element 6, the first engagement element 6 is moved to the movement end point on the side of the bar insertion hole 3 by the force of the first spring 7, and becomes a standby state. This standby state is kept until the base holder 2 and the locking member 8 are next coupled together.

In the above-described parting locking device 1 of the first embodiment, when the locking bar 13 is inserted into the bar insertion hole 3, and the lower end of the locking bar 13 passes through the installation point of the first engagement element 6, the first input portion 6b is pushed by the locking bar 13, so that the first engagement element 6 temporarily moves to the unlocking position.

However, at this time, since the locking plate 10 has not yet been completely inserted into the plate insertion hole 4, the engagement claw 6a and the second engagement element 11 are not yet engaged with each other.

When, thereafter, the locking plate 10 is inserted into the plate insertion hole 4, and the engagement claw 6a is pushed in by the locking plate 10, the first engagement element 6 moves again from the locking position to the unlocking position.

When, thereafter, the recess 12 of the locking plate 10 reaches the installation point of the first engagement element 6, the push-in force by the locking plate 10 is removed. As a result, the first engagement element 6 returns to the locking position by the force of the first spring 7, and the engagement claw 6a engages with the second engagement element 11, thereby keeping the base holder 2 and the locking member 8 coupled together.

When the locking bar 13 is pulled out of the bar insertion hole 3 of the base holder 2, the first input portion 6b of the first engagement element 6 protruding into the bar insertion hole 3 is completely pushed into the guide hole 5 by the first cam surface 13a of the locking bar 13.

In other words, the first engagement element 6 moves to the unlocking position, where the engagement claw 6a disengages from the second engagement element 11 by being completely pushed into the guide hole 5, thereby uncoupling the base holder 2 and the locking member 8 from each other.

Figure 7:
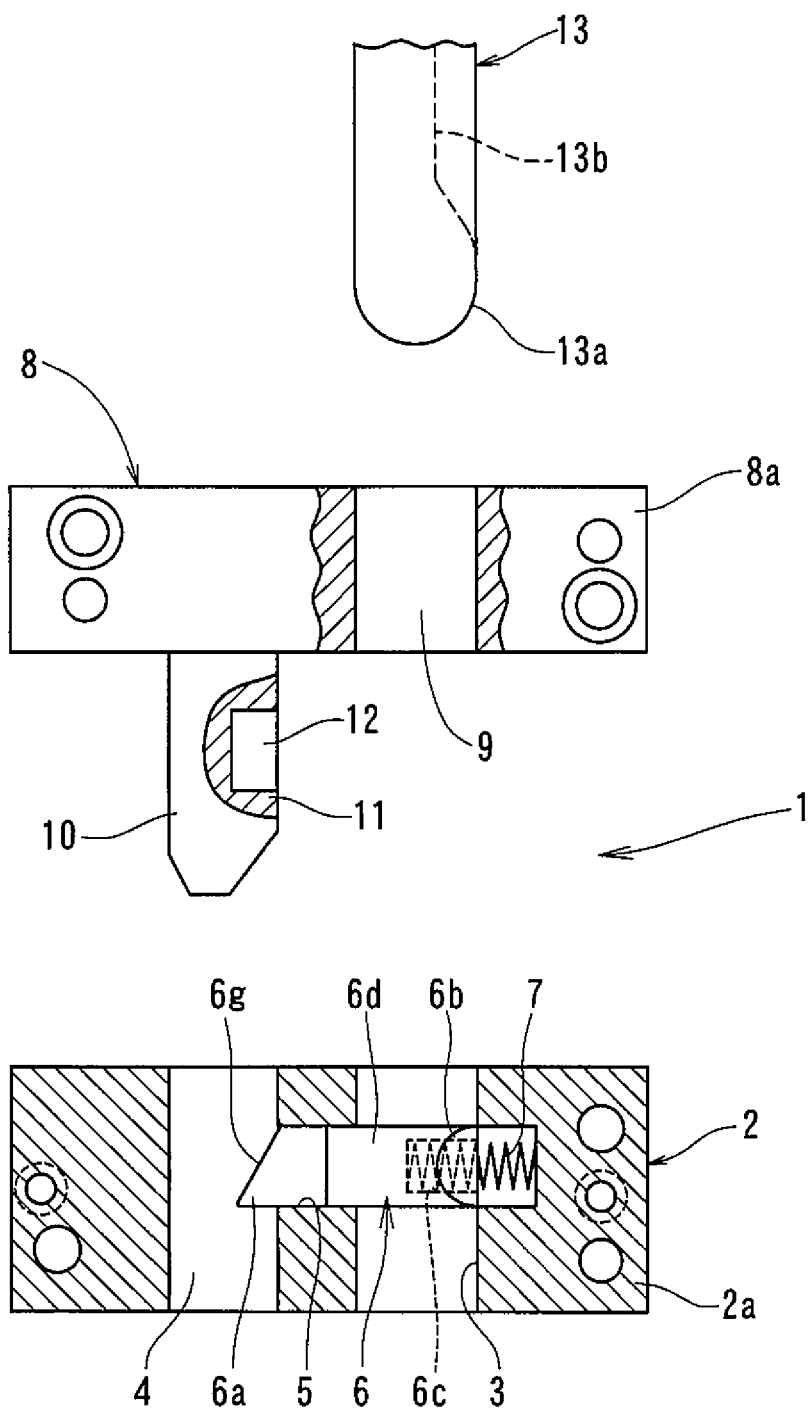
FIG. 7 is a side view of a parting locking device according to a second embodiment of the present invention in which the biased direction of the first engagement element in which the first engagement element is biased by a spring is opposite from the biased direction thereof in the first embodiment; the lid plate has been removed from the base holder; and a portion of the locking plate of the locking member has been broken.
Figure 8:
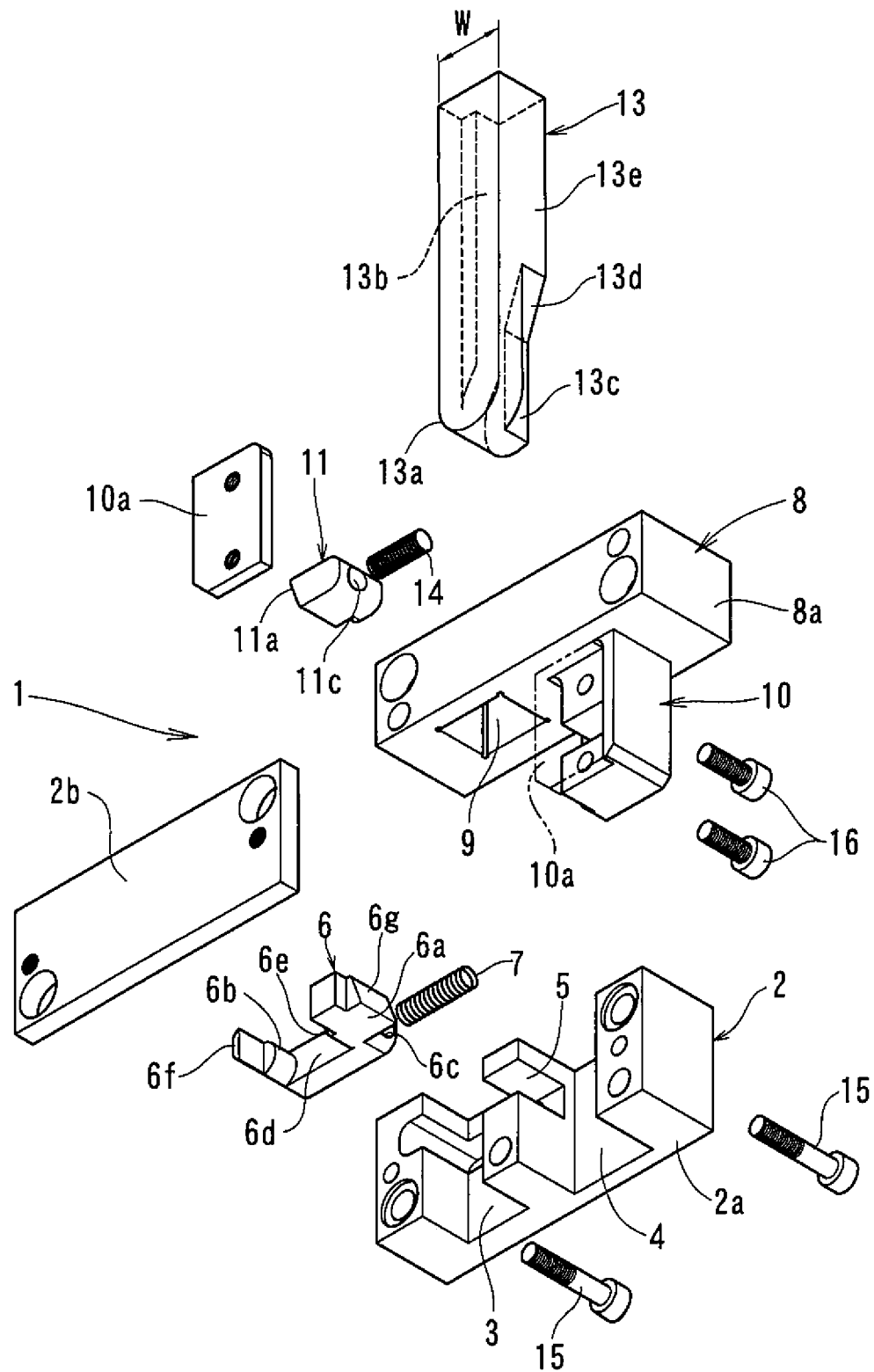
FIG. 8 is an exploded perspective view of a parting locking device according to a third embodiment of the present invention.
Figure 9:
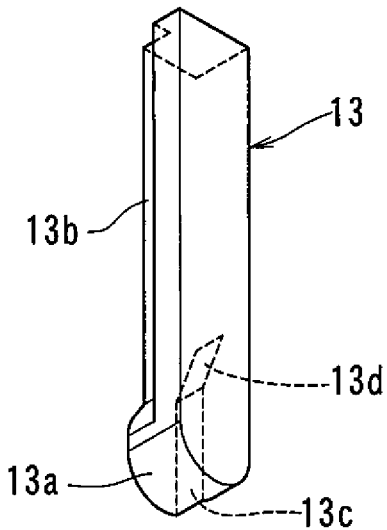
FIG. 9 is a perspective view of the parting locking device of FIG. 8 with the base holder and the locking member uncoupled from each other, and with the lid plate and a lid removed from the base holder and the locking plate, respectively.
Figure 9:
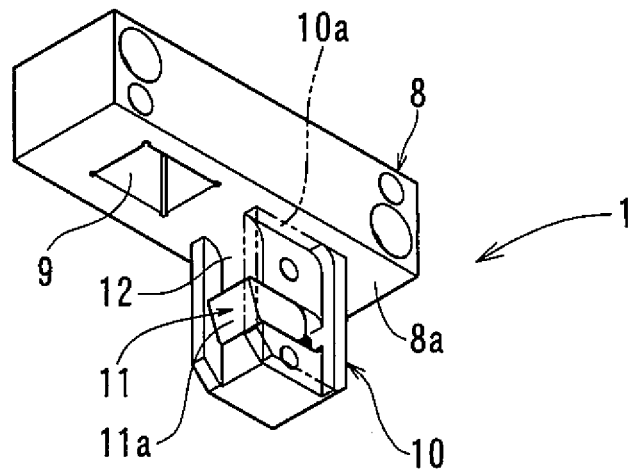
Figure 9:
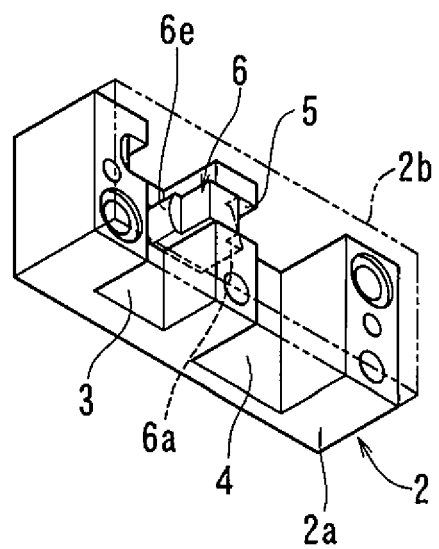
Figure 10:
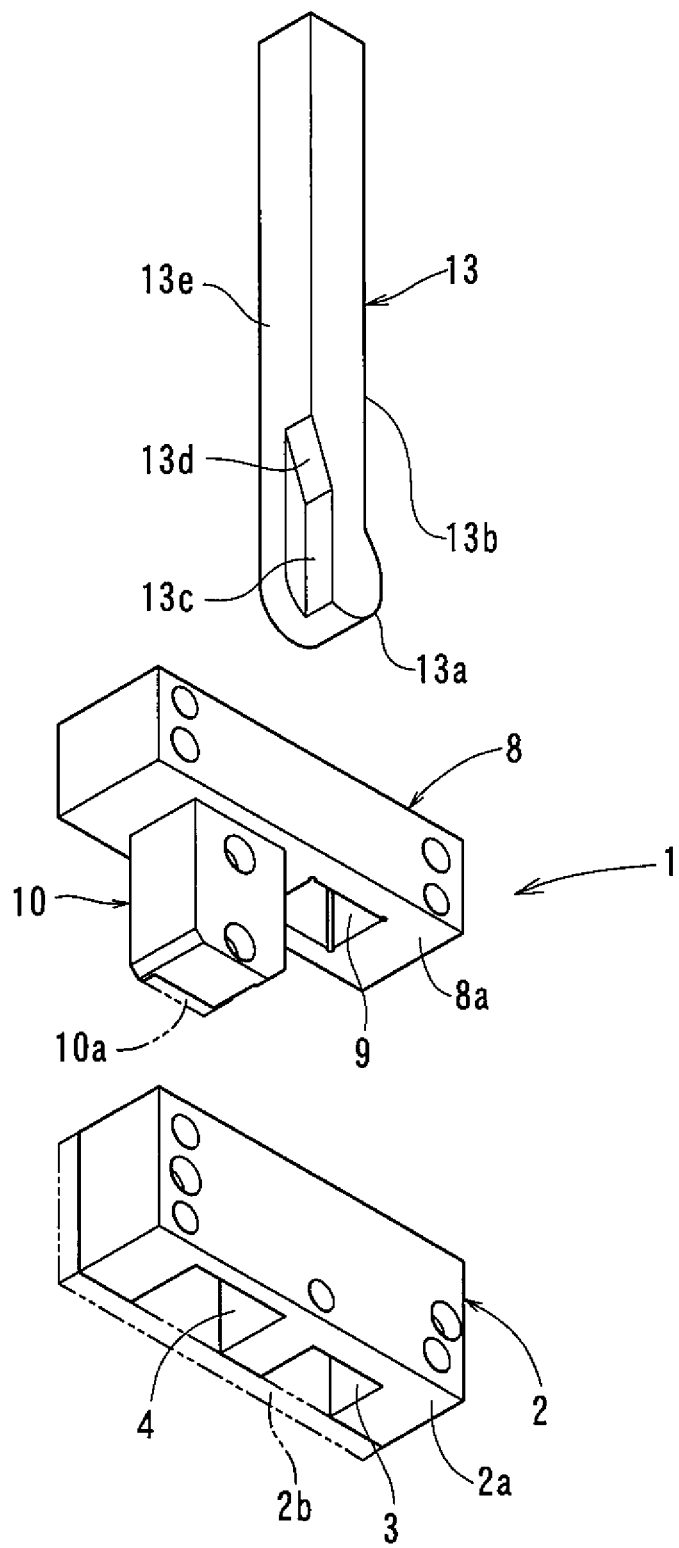
FIG. 10 is a perspective view of the parting locking device of FIG. 8 with the base holder and the locking member uncoupled from each other; with the lid plate and the lid removed from the base holder and the locking plate, respectively; and with the side surface of the parting locking device facing backward in FIG. 9 facing forward.
Figure 11:
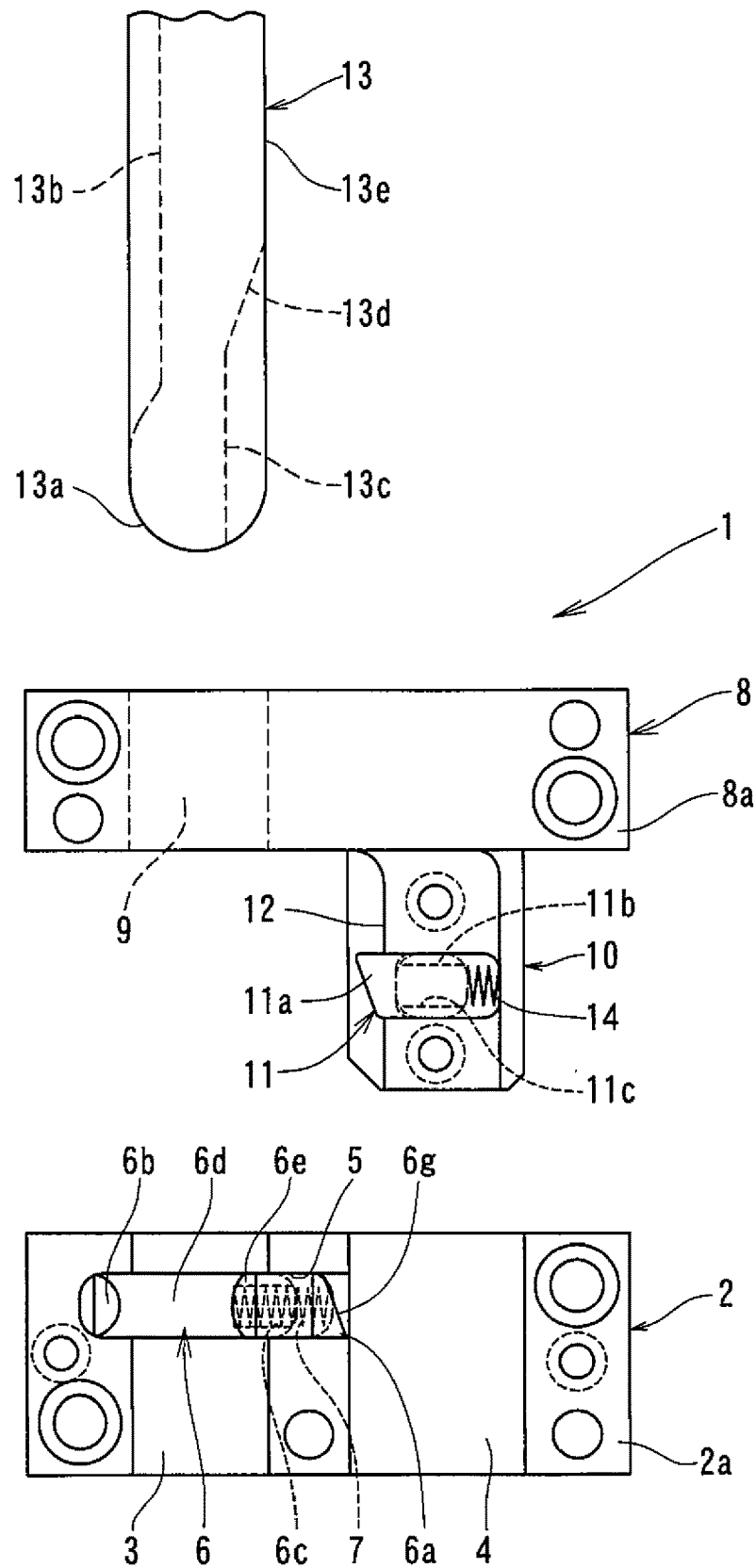
FIG. 11 is a side view of the parting locking device of FIG. 8 with the lid plate and the lid removed from the base holder and the locking plate of the locking member, respectively.
Figure 12:
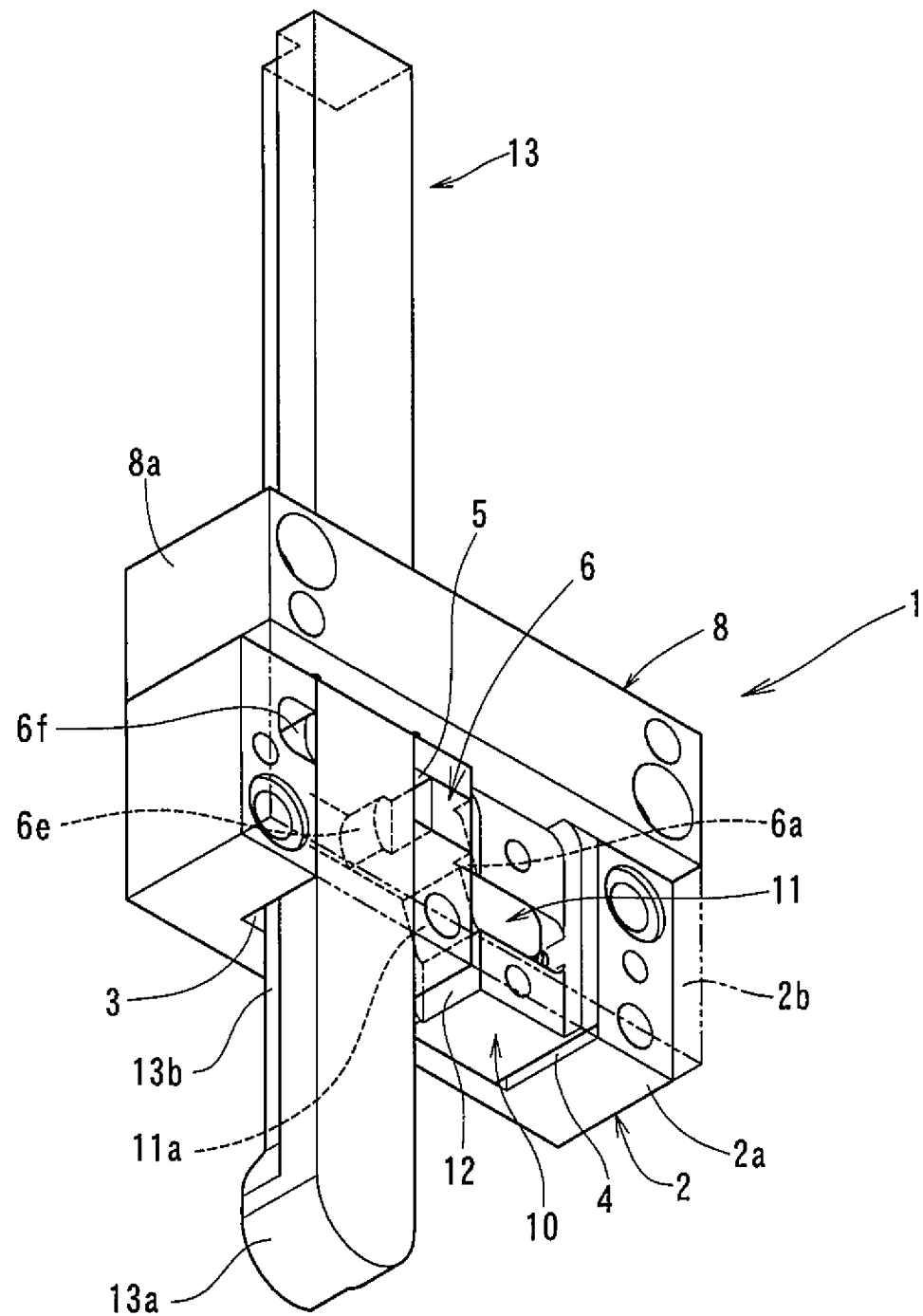
FIG. 12 is a perspective view of the parting locking device of FIG. 8 with the lid plate and the lid removed from the base holder and the locking plate of the locking member, respectively, and with the base holder and the locking member coupled together.

While, in the parting locking device 1 of the first embodiment, the first engagement element 6 is biased by the first spring 7 in the direction from the plate insertion hole 4 toward the bar insertion hole 3, the first engagement element 6 may be, as illustrated in FIG. 7, biased in the direction from the bar insertion hole 3 toward the plate insertion hole 4. (The device of FIG. 7 is referred to as the device of the second embodiment.)

In the device of the second embodiment, the engagement claw 6a and the first input portion 6b also face in the direction opposite to the direction in which these elements of the first embodiment face, and the recess 12 and the second engagement element 11 are disposed on the other side of the locking plate 10.

The first cam surface 13a and the recess 13b for avoiding interference are also disposed on the other side of the locking bar 13, that is, face away from the locking plate 10.

FIGS. 8 to 15 illustrate a parting locking device 1 according to still another embodiment (third embodiment) of the present invention. In the device of the third embodiment, the first engagement element 6 is moved to the locking position by being pushed by the locking bar 13.

The first engagement element 6 is biased by the first spring 7 in the direction in which the first engagement element 6 moves toward the unlocking position.

The first engagement element 6 includes, in addition to the engagement claw 6a and the first input portion 6b, a second input portion 6e. The engagement claw 6a is small enough to be able to enter the recess 12 of the locking plate 10.

The first input portion 6b is disposed at the end of the first engagement element 6 opposite from the end thereof at which the engagement claw 6a is disposed. The first input portion 6b and the engagement claw 6a are connected together via the bridge portion 6d.

The second input portion 6e is located between the engagement claw 6a and the bridge portion 6d, while facing away from the engagement claw 6a, and facing the first input portion 6b across the bar insertion hole 3.

The second input portion 6e is small enough to be able to enter an anti-interference portion 13c disposed in the locking bar 13 for the purpose of avoiding interference with the locking bar 13.

The first input portion 6b, which faces the second input portion 6e across the bar insertion hole 3, includes a spacer portion 6f which fills the gap between the first input portion 6b and the lid plate 2b.

The recess 12 of the locking plate 10 is disposed on the one side of the locking plate 10 so as to extend from the root of the locking plate 10 to the lower end thereof. The second engagement element 11 is provided independently of the locking plate 10, and is slidably mounted in the locking plate 10 at its longitudinally intermediate portion.

A second spring 14 is further mounted in the locking plate 10 so as to make the second engagement element 11 protrude into the recess 12 from the interior of the locking plate 10.

The second engagement element 11 has, on its portion which protrudes into the recess 12, an inclined lower surface 11a inclined such that a component force in the direction in which the portion of the second engagement element 11 protruding into the recess 12 is retracted into the locking plate 10 is generated at the portion of the lower surface 11a in contact with the engagement claw 6a.

The second engagement element 11 has a spring receiving hole 11c (see FIGS. 8 and 11) in which the one end portion of the second spring 14 is inserted.

The upper surface 6g of the portion of the engagement claw 6a which protrudes into the plate insertion hole 4, which (upper surface 6g) is configured to come into contact with the lower surface 11a, is also an inclined surface corresponding to the lower surface 11a. (Only one of the lower surface 11a of the second engagement element 11 and the upper surface 6g of the engagement claw 6a may be an inclined surface)

The second engagement element 11 and the second spring 14 are received in a groove formed in the surface of the locking plate 10 opposed to the lid plate 2b, and the opening of this groove through which the second engagement element 11 and the second spring 14 are mounted is closed by a lid 10a. The lid 10a is fixed to a predetermined portion of the locking plate 10 by bolts 16 (see FIG. 8).

The groove receiving the second engagement element 11 has a deep portion in which a protrusion 1ib (see FIG. 11 and FIGS. 13 to 15) of the second engagement element 11 on one side surface thereof is received, thereby preventing the second engagement element 11 from coming out of the locking plate 10.

This movable second engagement element 11 and the second spring 14, which biases this engagement element, can be also used in the devices of the first and second embodiments, in which the first engagement element 6 is moved to the locking position by the first spring 7.

In the parting locking device 1 of the third embodiment, the locking bar 13 further includes the anti-interference portion 13c; a second cam surface 13d which pushes the second input portion 6e into the guide hole 5 when the locking bar 13 is moved in the bar insertion hole 3 in the locking direction (downward direction); and a locking position keeping portion 13e which keeps the first engagement element 6 at the locking position by preventing the return of the second input portion 6e which has now been pushed into the guide hole 5.

The anti-interference portion 13c is formed at a distal end portion of the locking bar 13 by recessing about half, in the thickness direction of the locking bar 13, of the side surface of the locking bar 13 including the locking position keeping portion 13e, in the direction in which the width W (see FIG. 8) of the locking bar 13 decreases. The second cam surface 13d is connected to the terminal end (upper end) of the anti-interference portion 13c.

While, in the parting locking device 1 of each of the first and second embodiments, the first cam surface 13a is disposed at the lower end of the locking bar 13, in the parting locking device 1 of the third embodiment, the first cam surface 13a is located such that, when the lower end of the locking bar 13 has passed through the locking member 8, the first cam surface 13a comes into contact with the first input portion 6b of the first engagement element 6, thereby applying a push-in force to the first engagement element 6 that tends to push the first engagement element 6 into the guide hole 5.

Figure 13:
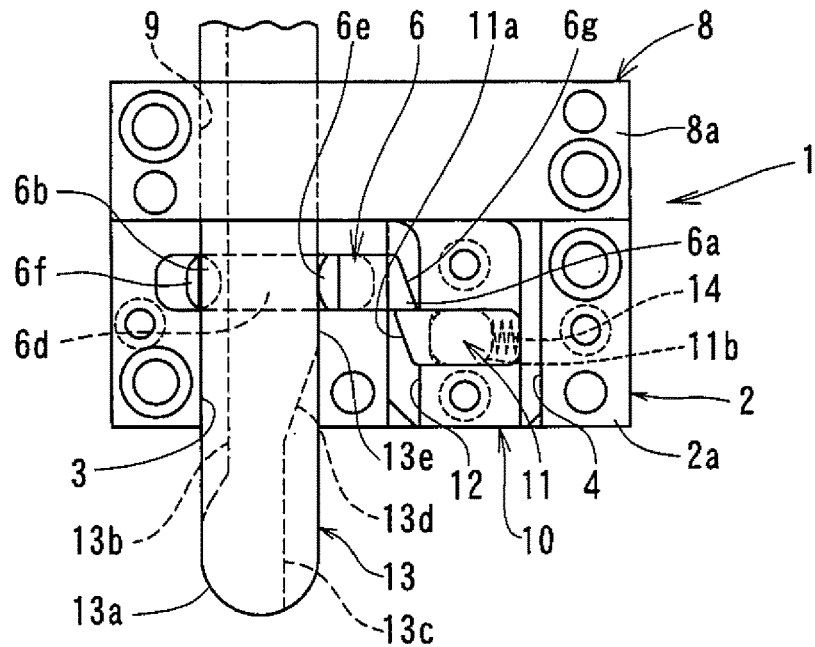
FIG. 13 is a side view of the parting locking device of FIG. 8 with the lid plate and the lid removed from the base holder and the locking plate of the locking member, respectively, and with the base holder and the locking member coupled together.
Figure 14:
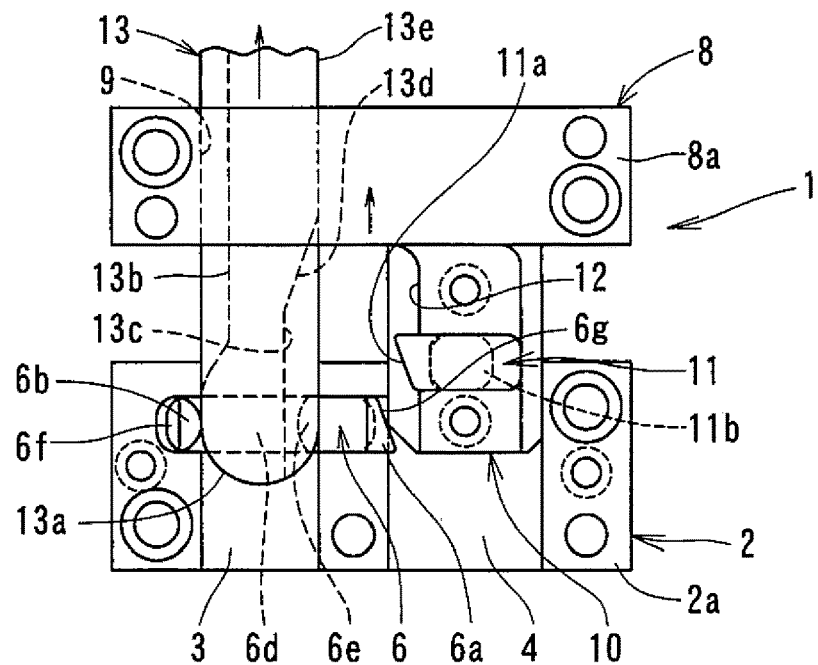
FIG. 14 is a side view of the parting locking device of FIG. 8 in which the first engagement element has been pushed and moved to the unlocking position by the locking bar, and the lid plate and the lid have been removed from the base holder and the locking plate of the locking member, respectively.
Figure 15:
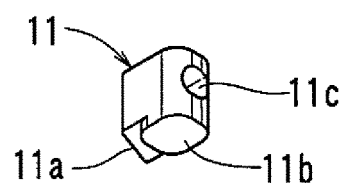
FIG. 15 is a perspective view of a second engagement element mounted in the locking plate of the locking member of the parting locking device shown in FIG. 8.

In the parting locking device of the above-described third embodiment, when the locking bar 13 is inserted into the bar insertion hole 3, and the lower end of the locking bar 13 passes through the installation point of the first engagement element 6, the first input portion 6b is pushed in by the locking bar 13, and, thereafter, the first engagement element 6 moves to the locking position shown in FIG. 13.

Once moved to the locking position, the first engagement element 6 is kept at the locking position by the locking position keeping portion 13e of the locking bar 13.

If, at this time, the locking plate 10 has not yet been inserted into the plate insertion hole 4, and, if the second engagement element 11 is integral with the locking plate 10 and thus immovable, the engagement claw 6a of the first engagement element 6 protruding into the plate insertion hole 4 will become an obstacle preventing the insertion of the locking plate 10 into the plate insertion hole 4.

In many injection molding machines of the three-plate type, in order to separate the movable mold from the fixed mold, the stripper plate has to be separated a relatively large distance from the movable mold.

In such an injection molding machine, before the locking plate 10 is inserted into the plate insertion hole 4, the locking bar 13 is inserted through the bar insertion hole. Therefore, the device of any embodiment needs to be designed such that, in such a case, too, the insertion of the locking plate 10 into the plate insertion hole 4 is allowed.

In the device of each of the first and second embodiments, since, when the locking plate 10 is inserted into the plate insertion hole 4, the engagement claw 6a can retreat, it is possible to avoid the situation where the locking plate 10 cannot be inserted. However, in the parting locking device 1 of the third embodiment, when the locking plate 10 is inserted, the first engagement element 6 is immovable at the locking position because it is kept at the locking position by the locking bar 13 which has been inserted before the insertion of the locking plate.

Thus, in the parting locking device 1 of the third embodiment, a movable engagement element is used as the second engagement element 11, and the second engagement element 11 is retreated. Specifically, the second engagement element 11 is retracted into the locking plate 10 by the component force of the locking plate insertion force generated at the contact portion with the locking plate 10.

Therefore, it is possible to insert the locking plate 10 into the plate insertion hole 4 while avoiding the interference of the second engagement element 11 with the engagement claw 6a, and thus to couple the locking member 8 to the base holder 2 with no problem.

When the locking plate 10 is inserted completely into the plate insertion hole 4, the second engagement element 11 is returned to its original protruding position by the force of the second spring 14, and, as illustrated in FIG. 13, the second engagement element 11 engages with the engagement claw 6a, thereby keeping the base holder 2 and the locking member 8 coupled together.

When the locking bar 13 is pulled out of the bar insertion hole 3, as in the devices of the first and second embodiments, the first cam surface 13a of the locking bar 13 pushes the first input portion 6b of the first engagement element 6 protruding into the bar insertion hole 3 completely into the guide hole 5 (see FIG. 14), thus moving the first engagement element 6 to the unlocking position, so that the locking member 8 becomes separable from the base holder 2.

Since, in the third embodiment, both of the movement of the first engagement element 6 from the unlocking position to the locking position and the return thereof from the locking position to the unlocking position are performed by pushing the first engagement element 6 with the locking bar 13, the device of the third embodiment can operate more reliably than the devices of the first and second embodiments.

FIGS. 16 to 20 illustrate a parting locking device 1 according to yet another embodiment (fourth embodiment) of the present invention. The parting locking device 1 of the fourth embodiment is configured such that the locking plate 10 inserted in the plate insertion hole 4 is prevented from being pulled out of the plate insertion hole 4 by pushing, with the first spring 7, only the engagement claw 6a of the first engagement element 6 toward the plate insertion hole 4.

Figure 16:
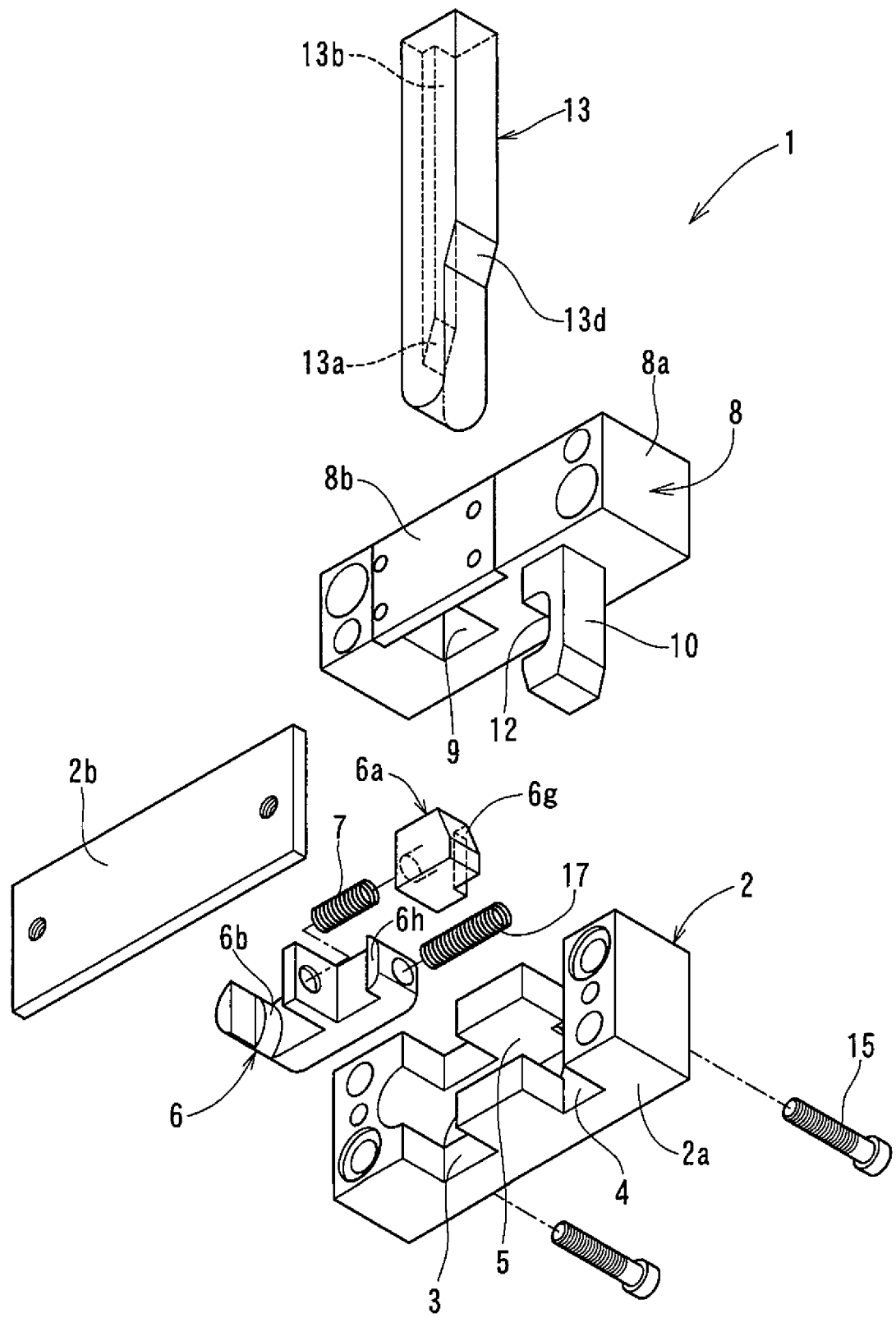
FIG. 16 is an exploded perspective view of a parting locking device according to a fourth embodiment of the present invention.
Figure 17:
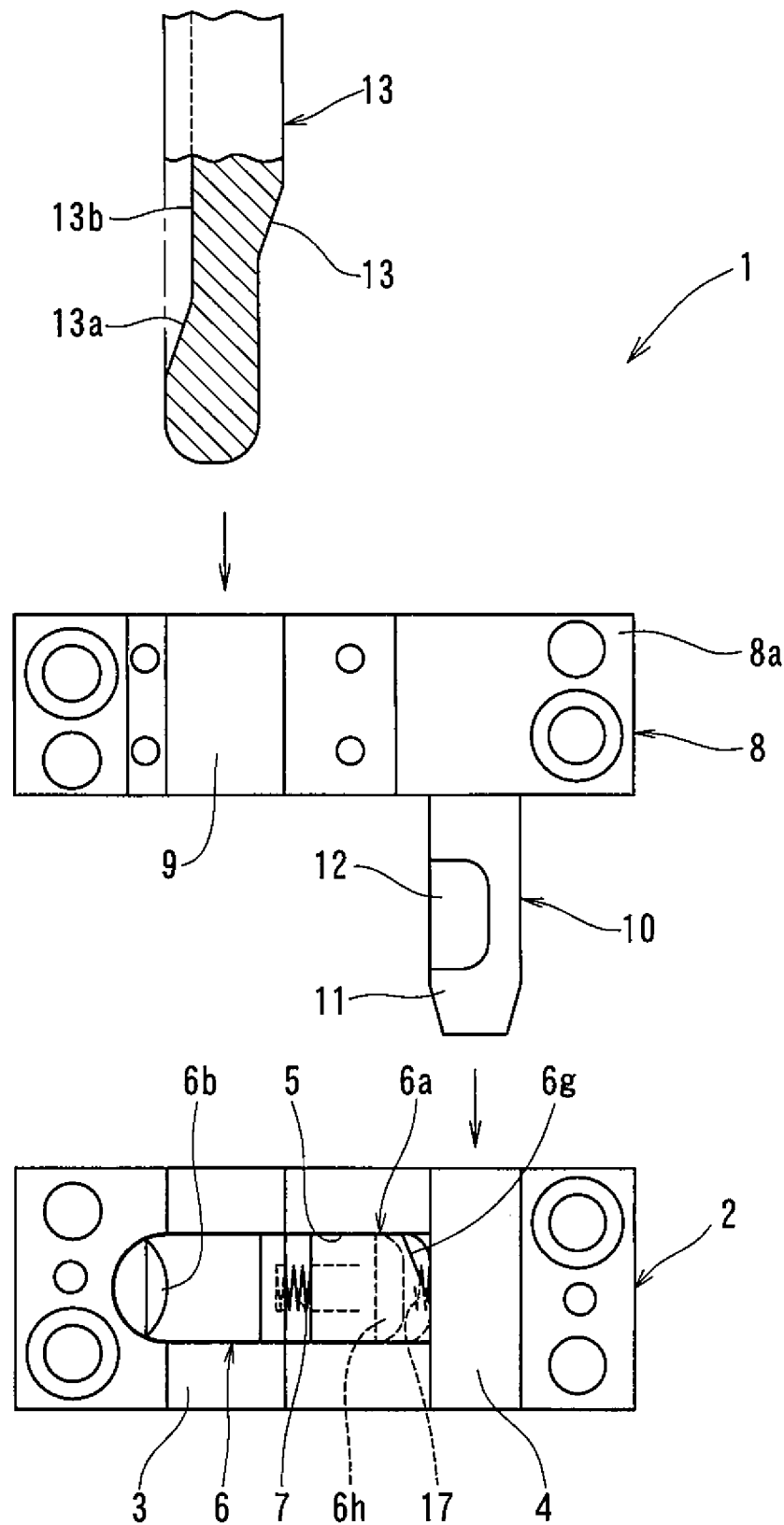
FIG. 17 is a side view of the parting locking device of FIG. 16 with lid plates removed from the base holder and the locking member, respectively, and with a portion of the locking bar broken.

As can be seen from FIG. 16, the engagement claw 6a of the first engagement element 6 and the part of the first engagement element 6 including the first input portion 6b are separated from each other between the plate insertion hole 4 and the bar insertion hole 3, and the first spring 7 is disposed between the engagement claw 6a and the part including the first input portion 6b.

The device further includes a third spring (return spring) 17 for pushing and moving the part of the first engagement element 6 including the first input portion 6b toward the unlocking position.

The upper surface 6g of the engagement claw 6a is an inclined surface for generating, at the portion in contact with the second engagement element 11, a component force in the direction in which the engagement claw 6a protruding into the plate insertion hole 4 is retracted into the guide hole 5. The recess 12 is, as in the parting locking device of the first embodiment, disposed in an intermediate portion of the locking plate 10, which is carried by the locking member 8, between its root and lower end.

The bar insertion hole 9 of the locking member 8 is defined by closing, with a lid 8b, an opening of a groove opening to the outside, but as shown in FIG. 1, the bar insertion hole 9 may be a hole formed without using a lid.

The engagement claw 6a is guided by the part of the first input portion 6b so as to be received, at its protrusion end point, by a stopper 6h of the part including the first input portion 6b, and so as to be allowed to retreat from the received position while compressing the first spring 7.

In the device of the fourth embodiment, too, instead of inclining the upper surface 6g of the engagement claw 6a, the corner of the lower surface of the locking plate 10 which comes into contact with the engagement claw 6a may be inclined in the direction in which the above component force is generated. Both of the upper surface 6g and the above corner of the lower surface of the locking plate 10 are preferably inclined in the same direction, but only one of them may be an inclined surface.

In the fourth embodiment, an incline surface rising from the bottom of the recess 13b for avoiding interference, which is formed on the one side of the locking bar 13, is used as the first cam surface 13a.

In the fourth embodiment, if a situation occurs where the first engagement element 6 is not normally returned to the unlocking position by the force of the third spring (return spring) 17, the first cam surface 13a on the one side of the locking bar 13 forcibly pushes the first engagement element 6 back to the unlocking position. The other elements of the locking bar 13 are the same as those of the locking bar of the third embodiment.

The above-described parting locking device 1 of the fourth embodiment is, as in the third embodiment, configured such that, even when the locking bar 13 is inserted through the bar insertion hole 3 before the insertion of the locking plate 10 into the plate insertion hole 4, the insertion of the locking plate 10 into the plate insertion hole 4 is allowed.

If the locking bar 13 has not yet been inserted through the bar insertion hole 3, since the first engagement element 6 is kept at the unlocking position by the force of the third spring (return spring) 17, it is possible to insert the locking plate 10 into the plate insertion hole 4 with no problem.

Figure 18:
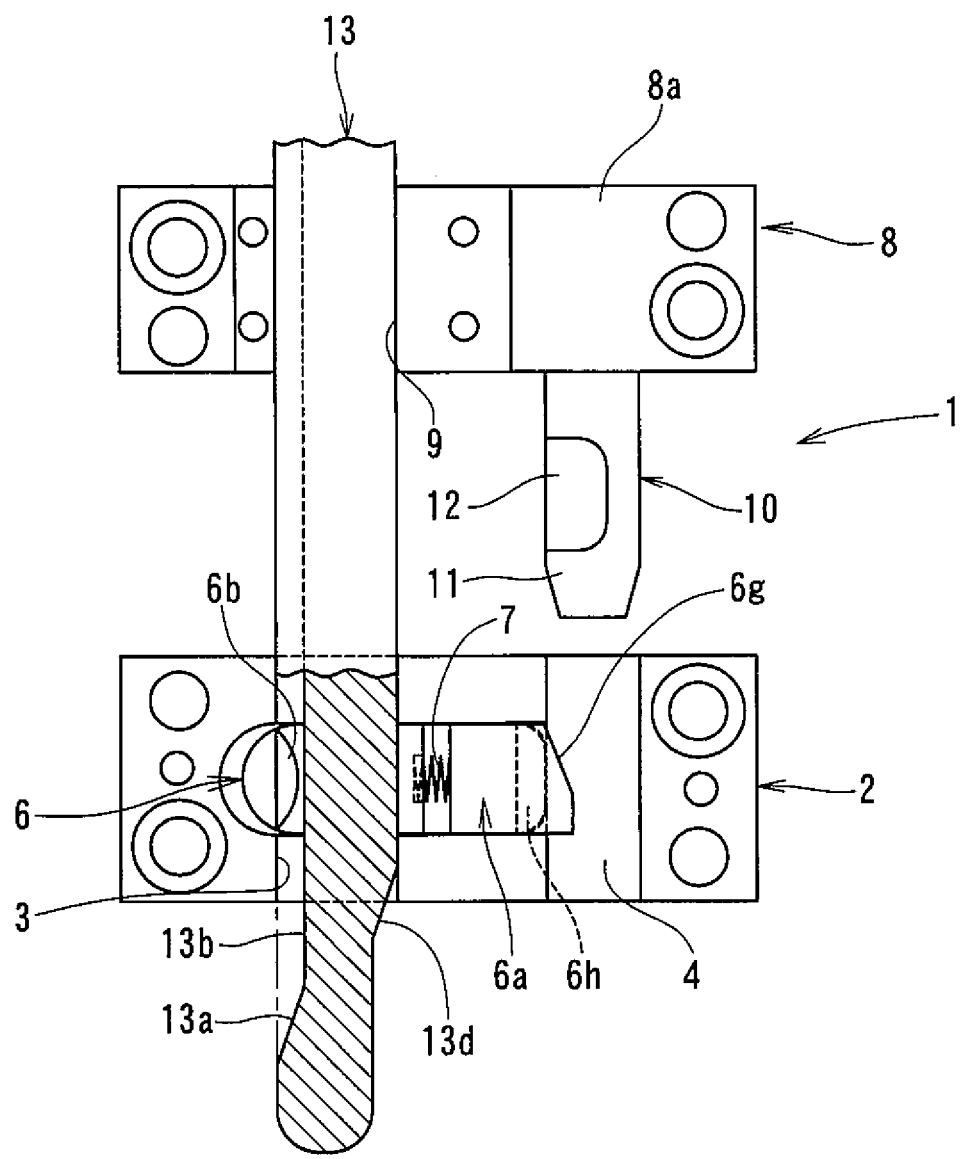
FIG. 18 is a side view of the parting locking device of FIG. 16 with the locking bar inserted through the base holder before the insertion of the locking plate, and with the lids (lid plates) removed from the base holder and the locking member, respectively.

If, as illustrated in FIG. 18, the locking bar 13 is first inserted through the bar insertion hole 3, the first engagement element 6 is pushed to the locking position by the second cam surface 13d, so that the engagement claw 6a protrudes into the plate insertion hole 4.

Figure 19:
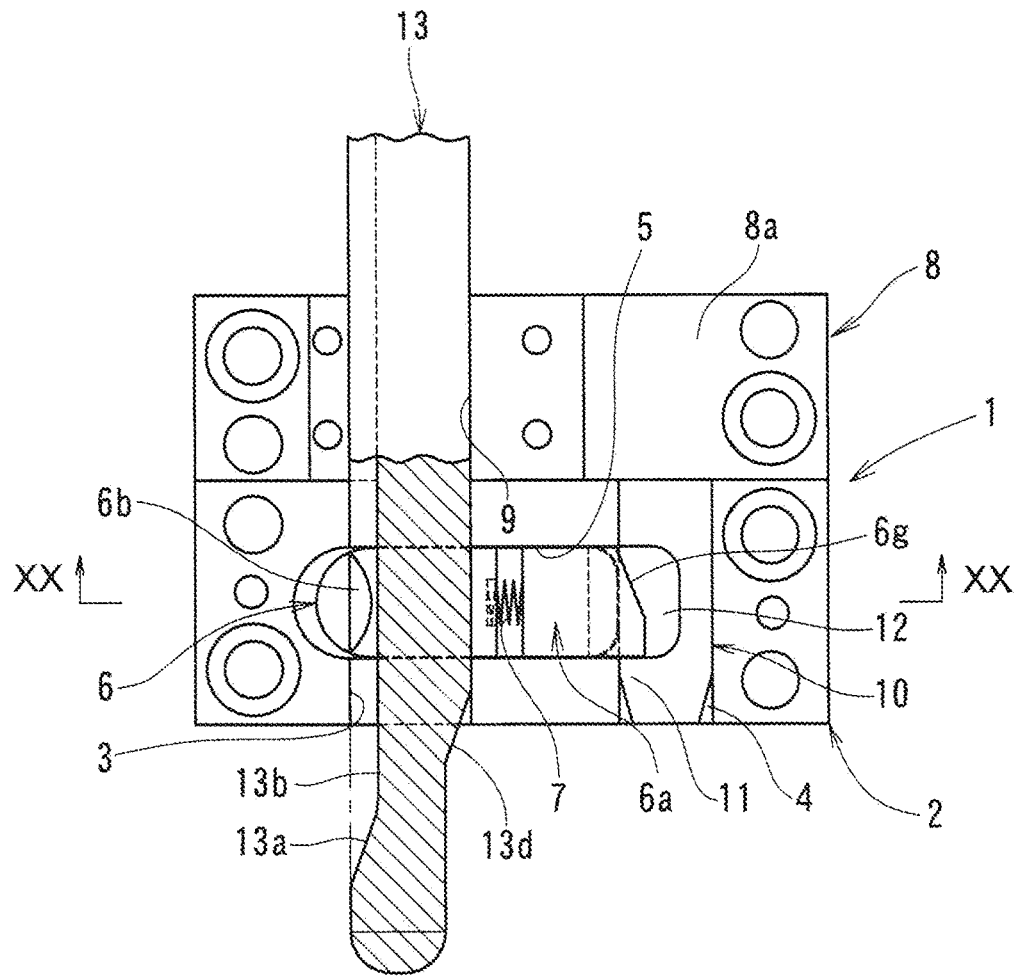
FIG. 19 is a side view of the parting locking device of FIG. 16 with both of the locking bar and the locking plate, respectively, inserted through and inserted in the base holder, and with the lids removed from the base holder and the locking member, respectively.
Figure 20:
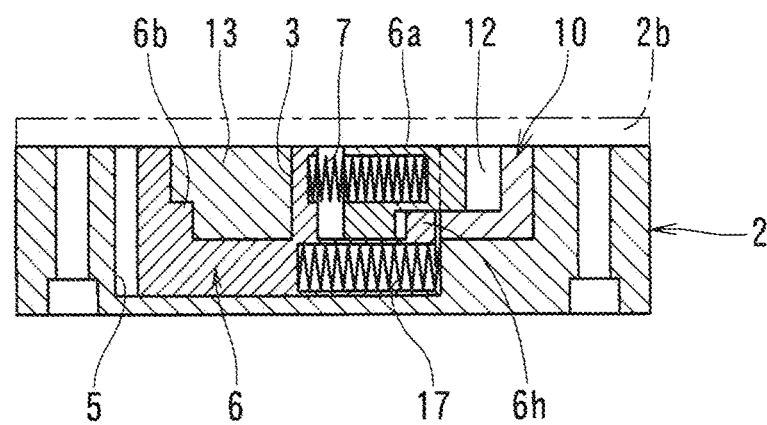
FIG. 20 is a sectional view taken along line XX-XX of FIG. 19.
Figure 21:
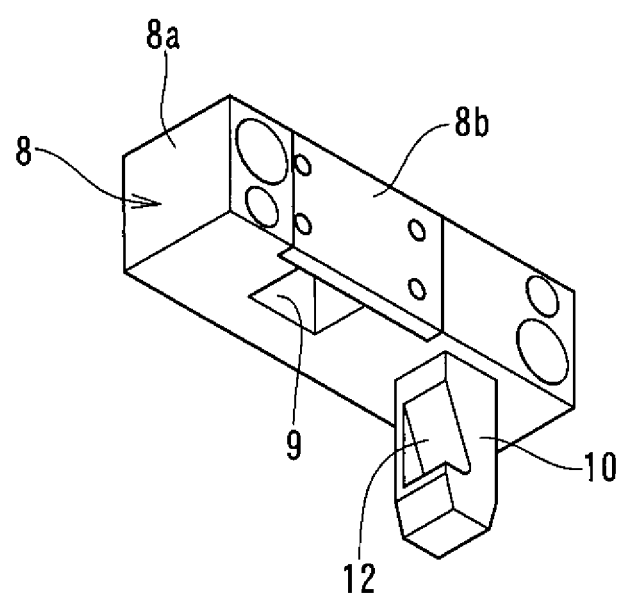
FIG. 21 is a perspective view illustrating a variation of the locking plate.

However, since the engagement claw 6a can be retracted into the guide hole 5 while compressing the first spring 7, when the engagement claw 6a is pushed by the locking plate 10, it is temporarily moved to a position where the insertion of the locking plate 10 is allowed. Thereafter, as illustrated in FIG. 19, the engagement claw 6a is inserted into the recess 12 by protruding into the plate insertion hole 4 again due to the force of the first spring 7, and engages with the second engagement element 11, thereby preventing the locking plate 10 from being pulled out.

In the parting locking device 1 of the fourth embodiment, if a situation occurs where the first engagement element 6 is not returned to the unlocking position by the force of the third spring (return spring) 17, as in the other embodiments, when the locking bar 13 is pulled out of the bar insertion hole 3, the first locking element 6 is pushed to the unlocking position by the cam surface 13a, thereby forcibly uncoupling the base holder 2 and the locking member 8 from each other.

Compared to the device of Patent Document 1, the devices of the first to fourth embodiments have, as can be seen from the relevant drawings, a simple structure, and can be easily manufactured and assembled, and can be reduced in size. Of these advantages, the simple structure and the reduced size are particularly remarkable in the device of the fourth embodiment, and for this reason, the device of the fourth embodiment is considered to be the most advantageous in practical use.

While, in each of the above-described first to fourth embodiments, the locking member 8 includes a bar insertion hole 9 extending vertically therethrough, corresponding to the bar insertion hole 3 of the base holder 2, the side of the locking member 8 including the bar insertion hole 9 may be omitted. Specifically, a portion of the locking member 8 on one side of the locking plate 10 including the bar insertion hole 9 may be omitted together with the bar insertion hole 9 so that the locking member 8 does not prevent the insertion of the locking bar 13 into the bar insertion hole 3 of the base holder 2.

Figure 22:
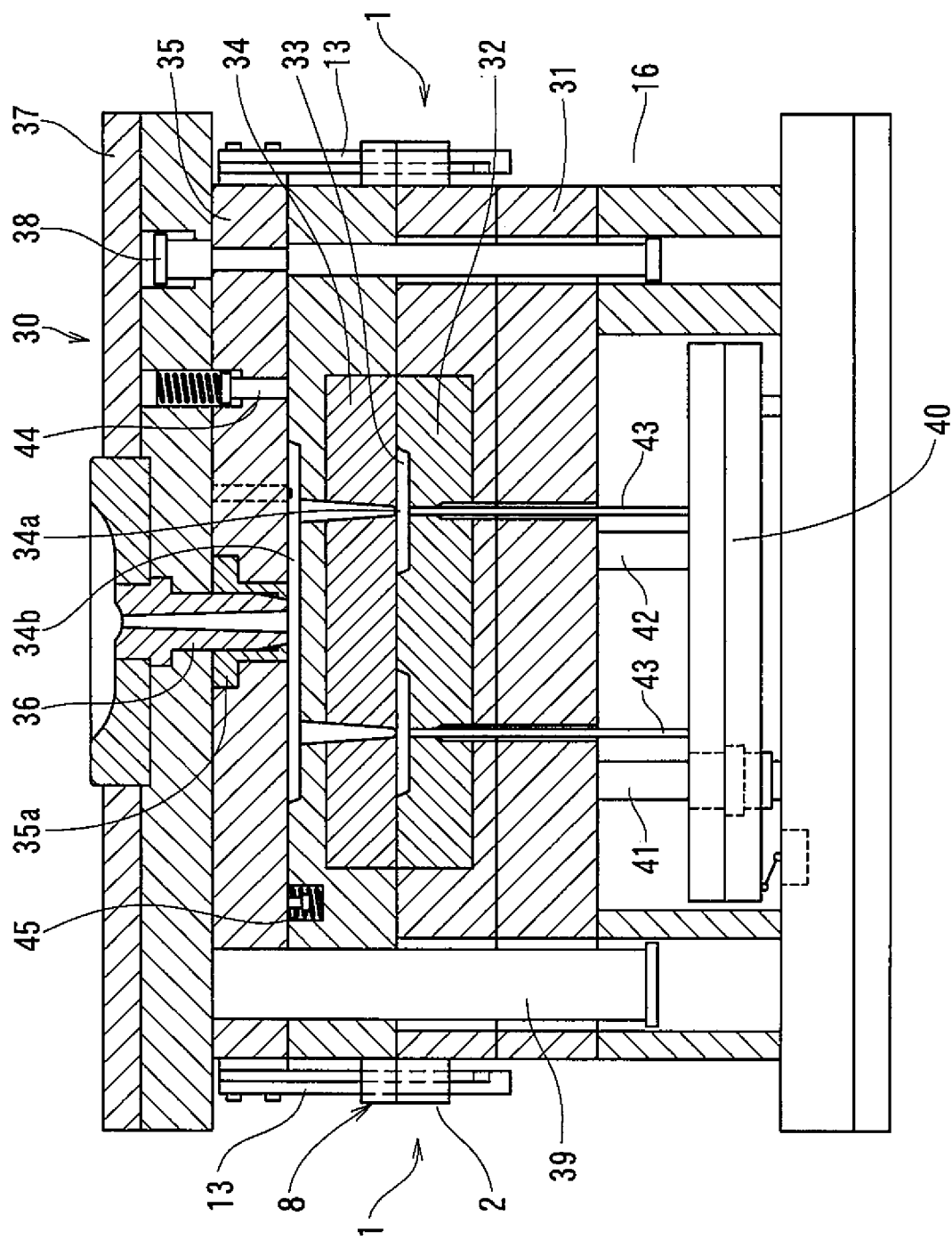
FIG. 22 is a sectional view of an injection molding mold assembly according to the present invention.
Figure 23:
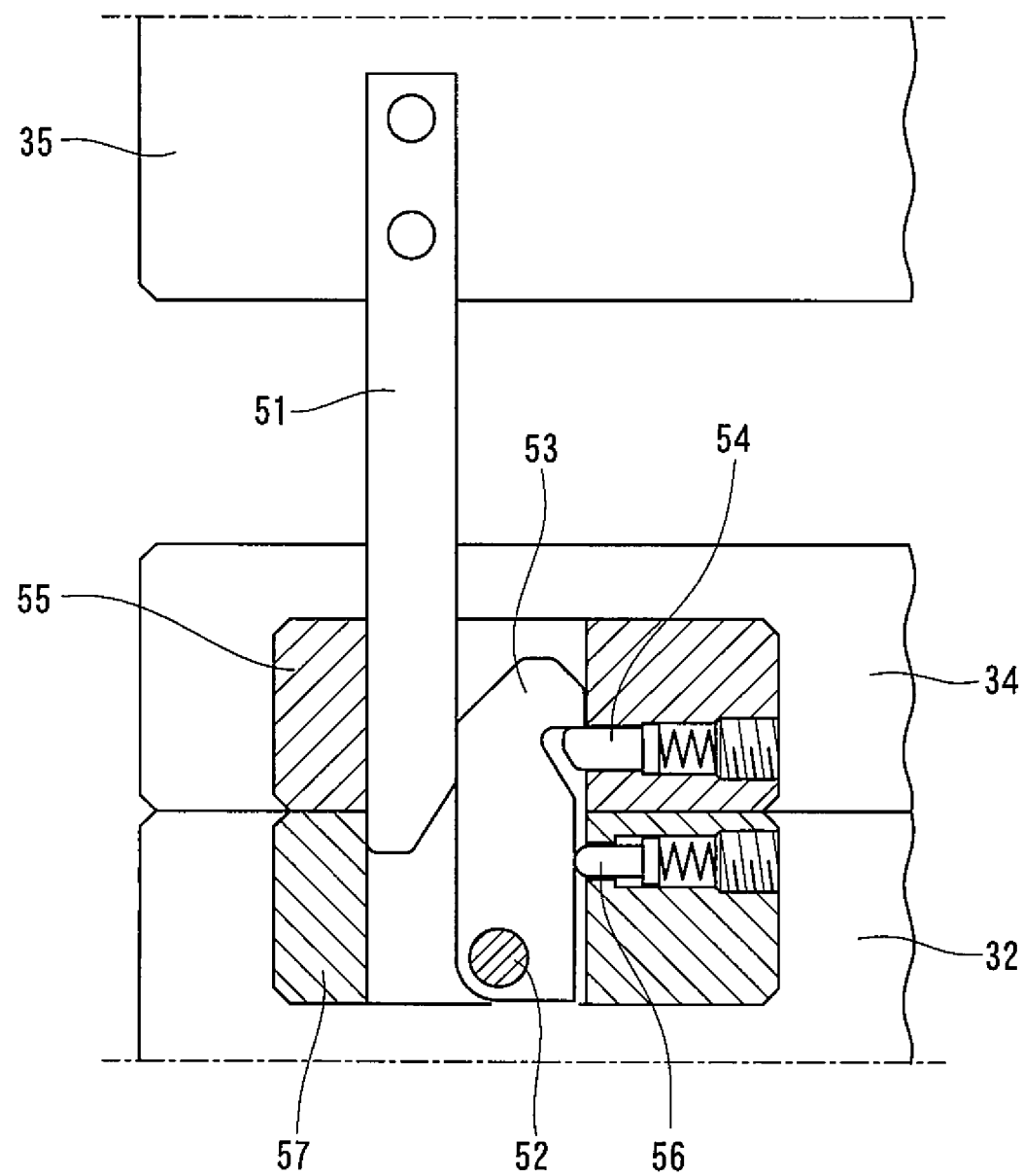
FIG. 23 is a sectional view of a conventional parting locking device.

Next, FIG. 22 illustrates an injection molding mold assembly of a three-plate type of injection molding machine in which parting locking devices 1 as described above are used.

The shown injection molding mold assembly 30 includes a fixed mold 32 supported by a fixed plate 31; a movable mold 34 defining, between the fixed mold 32 and the movable mold 34, a cavity 33 for molding; a stripper plate 35 including a spool bush guide 35a, and configured to be brought into contact with, and separated from, the movable mold 34; and a spool bush 36 configured to be inserted into the spool bush guide 35a of the stripper plate 35 when molten resin is supplied.

The injection molding mold assembly 30 further includes a spool plate 37 to which the spool bush 36 is mounted; a pulling pin 38; a support pin 39 configured such that, after the spool plate 37 moves by a predetermined distance, the support pin 39 transmits the movement of the spool plate 37 to the movable mold 34, thereby pulling and moving the movable mold 34; an ejector plate 40 disposed under the fixed plate 31; a guide pin 41 and a support pillar 42 configured to guide the ejector plate 40; ejector pins 43 mounted to the ejector plate 40; and a pusher pin 44 and a coil spring 45 configured to separate the stripper plate 35 from the movable mold 34.

The pulling pin 38 is fixed to the stripper plate 35, and configured to allow the stripper plate 35 to move together with the spool plate 37 after the spool plate 37 moves slightly away from the stripper plate 35.

Though not shown, the injection molding mold assembly 30 further includes a temperature sensor, switches for operation check, and a cavity degassing portion.

The movable mold 34 includes a gate or gates 34a constituting an inlet or inlets to the cavity 33; and a flow path 34b by which molten resin supplied through the spool bush 36 is guided to the gate(s) 34. For the mold having a plurality of such gates 34a, molten resin is distributed to the respective gates 34a via the flow path 34b.

The parting locking devices 1 are each mounted to either side of the injection molding mold assembly 30. By mounting the parting locking devices 1 each on either side, it is possible to move the stripper plate 35 and the movable mold 34 in a smooth manner.

The parting locking devices 1 are each mounted to the injection molding mold assembly 30 such that the base holder 2 is fixed to the fixed mold 32, the locking member 8 is fixed to the movable mold 34, and the locking bar 13 is mounted to the stripper plate 35.

The shown injection molding mold assembly 30 is configured such that, in the state illustrated in FIG. 22, where the movable mold 34 and the stripper plate 35 are in abutment with the fixed mold 32 and the movable mold 34, respectively, and the spool bush 36 is inserted in the spool bush guide 35a, molten resin is supplied into the cavity 33.

When the spool plate 37 is moved thereafter, the stripper plate 35 begins to move together with the spool plate 37 after the spool plate 37 begins to move, so that a runner portion constituted by the resin remaining in the flow path 34b is separated from the product in the cavity.

When the spool plate 37 further moves thereafter, the fixed mold 32 and the movable mold 34, which have been coupled together by the parting locking devices 1, are uncoupled. In this state, the support pin 39 pulls and moves the movable mold 34, thus opening the cavity 33, and the ejector pins 43 eject/push the products out of the cavities 33.

While, in the above embodiment, the parting locking devices are used in a three-plate type of injection molding machine to allow separating movements of the stripper plate and the movable mold in a predetermined order, the parting locking devices may be used in a two-plate type of injection molding machine so as to keep the movable mold in abutment with the fixed mold for a predetermined time.

It is possible to reliably keep the movable mold coupled to the fixed mold until the locking bars 13 move to uncoupling positions, by fixing one of the base holder 2 and the locking member 8 of each of the parting locking devices to the fixed mold, and the other to the movable mold; and further by including, in the mold assembly injection molding machine, a member configured to move, when opening the cavity, in the separation direction of the movable mold before the movable mold is separated from the fixed mold, and mounting the locking bars 13 to this member.

DESCRIPTION OF REFERENCE NUMERALS

1: Parting locking device
2: Base holder
2a: Body
2b: Lid plate
3: Bar insertion hole
4: Plate insertion hole
5: Guide hole
6: First engagement element
6a: Engagement claw
6b: First input portion
6c: Spring receiving hole
6d: Bridge portion
6e: Second input portion
6f: Spacer portion
6g: Upper surface of the portion of the engagement claw which protrudes into the plate insertion hole
6h: Stopper
7: First spring
8: Locking member
8a: Body
8b: Lid
9: Bar insertion hole
10: Locking plate
10a: Lid
11: Second engagement element
11a: Lower surface of the portion of the second engagement which protrudes into a recess
11b: Protrusion
11c: Spring receiving hole
12: Recess
13: Locking bar
13a: First cam surface
13b: Recess for avoiding interference
13c: Anti-interference portion
13d: Second cam surface
13e: Locking position keeping portion
14: Second spring
15, 16: Bolt
17: Third (return) spring
30: Injection molding mold assembly
31: Fixed plate
32: Fixed mold
33: Cavity
34: Movable mold
34a: Gate
34b: Flow path
35: Stripper plate
35a: Spool bush guide
36: Spool bush
37: Spool plate
38: Pulling pin
39: Support pin
40: Ejector plate
41: Guide pin
42: Support pillar
43: Ejector pin
44: Pusher pin
45: Coil spring
51: Locking bar
52: Support pin
53: Engagement claw
54: Locking claw
55: Base holder
56: Pushpin
57: Locking member

The invention claimed is:

1. A parting locking device comprising:
a base holder having a first bar insertion hole extending vertically through the base holder, and a plate insertion hole extending parallel to the first bar insertion hole;
a locking member having a second bar insertion hole, and including a locking plate configured to be inserted into the plate insertion hole;
a locking bar configured to be inserted into, and pulled out of, the first and second bar insertion holes of the base holder and the locking member;
a first engagement element and a first spring both mounted in the base holder; and
a second engagement element carried by the locking plate, wherein the base holder further has a guide hole configured to guide movement of the first engagement element in a direction orthogonal to a center axis of the first bar insertion hole, wherein the first bar insertion hole and the plate insertion hole communicate with each other via the guide hole, wherein the first engagement element includes:
an engagement claw configured to retractably protrude into the plate insertion hole from the guide hole; and
a first input portion configured to retractably protrude into the first bar insertion hole from the guide hole, wherein the locking plate includes a recess configured to receive a portion of the engagement claw protruding into the plate insertion hole, wherein the locking bar includes:
a first cam surface disposed on one side of the locking bar, and configured to push the first input portion, when the first input portion protrudes into the first bar insertion hole, into the guide hole; and
an interference avoiding recess located above the first cam surface, and configured to receive the first input portion when the first input portion protrudes into the first bar insertion hole, wherein the first engagement element is configured to be selectively moved to a locking position and an unlocking position by being pushed in opposite directions by the first spring and the locking bar, respectively, wherein the engagement claw is configured to protrude into the plate insertion hole with the first engagement element located at the locking position, and the engagement claw is configured to retract into the guide hole with the first engagement element located at the unlocking position, wherein, when the first engagement element is located at the locking position, the engagement claw is configured to engage with the second engagement element so as to prevent the locking plate from being pulled out of the plate insertion hole, and wherein, when the first engagement element is located at the unlocking position, the engagement claw is configured to be disengaged from the second engagement element so as to allow the locking plate to be pulled out of the plate insertion hole.

2. The parting locking device according to claim 1, wherein the first engagement element is biased by the first spring in a direction in which the first engagement element moves from the locking position toward the unlocking position, wherein the first engagement element further includes a second input portion configured to protrude into the first bar insertion hole when the first engagement element is located at the unlocking position, wherein the second input portion faces away from the engagement claw, and faces the first input portion across the first bar insertion hole, wherein the locking bar further includes:
a second cam surface configured to push the second input portion into the guide hole; and
a locking position keeping portion configured to keep the first engagement element at the locking position by preventing return of the retracted second input portion, and wherein both of movement of the first engagement element from the unlocking position to the locking position and movement of the first engagement element from the locking position to the unlocking position are performed by pushing the first engagement element with the locking bar.

3. The parting locking device according to claim 2, wherein the second engagement element is mounted in the locking plate so as to be, by being biased by a second spring, slidable in a direction orthogonal to a center axis of the plate insertion hole, and, so as to be able to retreat from a position where the second engagement element engages with the engagement claw, wherein at least one of an upper surface of the engagement claw and a lower surface of the locking plate configured to come into contact with the upper surface of the engagement claw is an inclined surface configured to generate, at contact portions of the lower and upper surfaces, a component force in a direction in which the second engagement element is retracted into the locking plate, and wherein the interference avoiding recess extends from a root of the locking plate to a lower end of the locking plate.

4. An injection molding mold assembly for molding resin or metal, the injection molding mold assembly comprising:
a fixed mold;
a movable mold defining, between the fixed mold and the movable mold, a cavity for molding resin or metal; and
a stripper plate configured to be brought into contact with, and separated from, the movable mold, wherein the injection molding mold assembly is configured such that, when opening the cavity, the stripper plate is separated from the movable mold before the movable mold is separated from the fixed mold, and wherein a pair of parting locking devices are mounted to the injection molding mold assembly, each of the pair of parting locking devices being configured according to claim 3, and each of the pair of parting locking devices being mounted to a respective one of both sides of the injection molding mold assembly such that one of the base holder and the locking member of each of the pair of parting locking devices is fixed to the fixed mold, the other of the base holder and the locking member of each of the pair of parting locking devices is fixed to the movable mold, and the locking bar of each of the pair of parting locking devices is mounted to the stripper plate.

5. An injection molding mold assembly for molding resin or metal, the injection molding mold assembly comprising:
a fixed mold;
a movable mold defining, between the fixed mold and the movable mold, a cavity for molding resin or metal; and
a stripper plate configured to be brought into contact with, and separated from, the movable mold, wherein the injection molding mold assembly is configured such that, when opening the cavity, the stripper plate is separated from the movable mold before the movable mold is separated from the fixed mold, and wherein a pair of parting locking devices are mounted to the injection molding mold assembly, each of the pair of parting locking devices being configured according to claim 2, and each of the pair of parting locking devices being mounted to a respective one of both sides of the injection molding mold assembly such that one of the base holder and the locking member of each of the pair of parting locking devices is fixed to the fixed mold, the other of the base holder and the locking member of each of the pair of parting locking devices is fixed to the movable mold, and the locking bar of each of the pair of parting locking devices is mounted to the stripper plate.

6. The parting locking device according to claim 1, wherein the second engagement element is mounted in the locking plate so as to be, by being biased by a second spring, slidable in a direction orthogonal to a center axis of the plate insertion hole, and, so as to be able to retreat from a position where the second engagement element engages with the engagement claw,
wherein at least one of an upper surface of the engagement claw and a lower surface of the second engagement element configured to come into contact with the upper surface of the engagement claw is an inclined surface configured to generate, at contact portions of the lower and upper surfaces, a component force in a direction in which the second engagement element is retracted into the locking plate, and
wherein the interference avoiding recess extends from a root of the locking plate to a lower end of the locking plate.

7. An injection molding mold assembly for molding resin or metal, the injection molding mold assembly comprising:
a fixed mold;
a movable mold defining, between the fixed mold and the movable mold, a cavity for molding resin or metal; and
a stripper plate configured to be brought into contact with, and separated from, the movable mold,
wherein the injection molding mold assembly is configured such that, when opening the cavity, the stripper plate is separated from the movable mold before the movable mold is separated from the fixed mold, and
wherein a pair of parting locking devices are mounted to the injection molding mold assembly, each of the pair of parting locking devices being configured according to claim 6, and each of the pair of parting locking devices being mounted to a respective one of both sides of the injection molding mold assembly such that one of the base holder and the locking member of each of the pair of parting locking devices is fixed to the fixed mold, the other of the base holder and the locking member of each of the pair of parting locking devices is fixed to the movable mold, and the locking bar of each of the pair of parting locking devices is mounted to the stripper plate.

8. The parting locking device according to claim 1, wherein the first engagement element is configured to move to the locking position by being pushed by the first spring, and
wherein the first engagement element is configured to move from the locking position to the unlocking position by pushing, with the locking bar, the first input portion in a direction opposite to a direction in which the first engagement element is biased by the first spring.

9. An injection molding mold assembly for molding resin or metal, the injection molding mold assembly comprising:
a fixed mold;
a movable mold defining, between the fixed mold and the movable mold, a cavity for molding resin or metal; and
a stripper plate configured to be brought into contact with, and separated from, the movable mold,
wherein the injection molding mold assembly is configured such that, when opening the cavity, the stripper plate is separated from the movable mold before the movable mold is separated from the fixed mold, and
wherein a pair of parting locking devices are mounted to the injection molding mold assembly, each of the pair of parting locking devices being configured according to claim 8, and each of the pair of parting locking devices being mounted to a respective one of both sides of the injection molding mold assembly such that one of the base holder and the locking member of each of the pair of parting locking devices is fixed to the fixed mold, the other of the base holder and the locking member of each of the pair of parting locking devices is fixed to the movable mold, and the locking bar of each of the pair of parting locking devices is mounted to the stripper plate.

10. The parting locking device according to claim 1, wherein the engagement claw of the first engagement element and a part of the first engagement element including the first input portion are separated from each other between the plate insertion hole and the first bar insertion hole of the base holder, and the first spring is disposed between the engagement claw and the part of the first engagement element including the first input portion,
wherein the engagement claw is guided by the part of the first engagement element including the first input portion so as to be received, at a protrusion end point, by the part of the first engagement element including the first input portion, and allowed to retreat from the protrusion end point while compressing the first spring,
wherein the parting locking device further comprises a return spring for pushing and moving the part of the first engagement element including the first input portion toward the unlocking position,
wherein at least one of an upper surface of the engagement claw and a corner of a lower surface of the second engagement element configured to come into contact with the upper surface of the engagement claw is an inclined surface configured to generate, at contact portions of the lower and upper surfaces, a component force in a direction in which the engagement claw is retracted from the plate insertion hole into the guide hole, and
wherein the recess is disposed in an intermediate portion of the locking plate between a root of the locking plate and a lower end of the locking plate.

11. An injection molding mold assembly for molding resin or metal, the injection molding mold assembly comprising:
a fixed mold;
a movable mold defining, between the fixed mold and the movable mold, a cavity for molding resin or metal; and
a stripper plate configured to be brought into contact with, and separated from, the movable mold,
wherein the injection molding mold assembly is configured such that, when opening the cavity, the stripper plate is separated from the movable mold before the movable mold is separated from the fixed mold, and
wherein a pair of parting locking devices are mounted to the injection molding mold assembly, each of the pair of parting locking devices being configured according to claim 10, and each of the pair of parting locking devices being mounted to a respective one of both sides of the injection molding mold assembly such that one of the base holder and the locking member of each of the pair of parting locking devices is fixed to the fixed mold, the other of the base holder and the locking member of each of the pair of parting locking devices is fixed to the movable mold, and the locking bar of each of the pair of parting locking devices is mounted to the stripper plate.

12. An injection molding mold assembly for molding resin or metal, the injection molding mold assembly comprising:
   a fixed mold;
   a movable mold defining, between the fixed mold and the movable mold, a cavity for molding resin or metal; and
   a stripper plate configured to be brought into contact with, and separated from, the movable mold,
   wherein the injection molding mold assembly is configured such that, when opening the cavity, the stripper plate is separated from the movable mold before the movable mold is separated from the fixed mold, and
   wherein a pair of parting locking devices are mounted to the injection molding mold assembly, each of the pair of parting locking devices being configured according to claim 1, and each of the pair of parting locking devices being mounted to a respective one of both sides of the injection molding mold assembly such that one of the base holder and the locking member of each of the pair of parting locking devices is fixed to the fixed mold, the other of the base holder and the locking member of each of the pair of parting locking devices is fixed to the movable mold, and the locking bar of each of the pair of parting locking devices is mounted to the stripper plate.

* * * * *